US012345797B2

(12) United States Patent
Wu et al.

(10) Patent No.: US 12,345,797 B2
(45) Date of Patent: Jul. 1, 2025

(54) SUPER-RESOLUTION MIMO SPARSE ARRAY AUTOMOTIVE RADAR BASED ON FORWARD AND BACKWARD HANKEL MATRIX COMPLETION

(71) Applicant: NXP B.V., Eindhoven (NL)

(72) Inventors: Ryan Haoyun Wu, San Jose, CA (US); Dongyin Ren, East Brunswick, NJ (US); Jun Li, San Jose, CA (US)

(73) Assignee: NXP B.V., Eindhoven (NL)

( * ) Notice: Subject to any disclaimer, the term of this patent is extended or adjusted under 35 U.S.C. 154(b) by 336 days.

(21) Appl. No.: 17/990,681

(22) Filed: Nov. 19, 2022

(65) Prior Publication Data

US 2024/0168148 A1 May 23, 2024

(51) Int. Cl.
*G01S 13/42* (2006.01)
*G01S 7/42* (2006.01)
*H04B 7/0413* (2017.01)

(52) U.S. Cl.
CPC ............. *G01S 13/42* (2013.01); *G01S 7/42* (2013.01); *H04B 7/0413* (2013.01)

(58) Field of Classification Search
CPC .......... G01S 13/42; G01S 7/42; H04B 7/0413
See application file for complete search history.

(56) References Cited

U.S. PATENT DOCUMENTS

| 10,725,152 B2 | 7/2020 | Alcalde et al. | |
| 2023/0053001 A1* | 2/2023 | Wu | G01S 13/34 |

FOREIGN PATENT DOCUMENTS

| CN | 111337873 A | 6/2020 |
| CN | 111562545 A | 8/2020 |

OTHER PUBLICATIONS

Sun Shunqiao et al: "A Sparse Linear Array Approach in Automotive Radars Using Matrix Completion", May 2020 (May 4, 2020), pp. 8614-8618, ICASSP 2020—2020 IEEE International Conference on Acoustics, Speech and Signal Processing (ICASSP).
Ryan Haoyun Wu et al., U.S. Appl. No. 17/387,128, filed Jul. 28, 2021, entitled Radar Signal Processing with Forward-Backward Matrix.
Benjamin Friedlander et al., Direction Finding Using Spatial Smoothing with Interpolated Arrays, IEEE Transactions on Aerospace and Electronic Systems, vol. 28, No. 2, Apr. 1992.

(Continued)

*Primary Examiner* — Curtis B Odom

(57) ABSTRACT

A distributed aperture radar system, apparatus, architecture, and method are provided for generating a completed virtual array aperture by using a radar control processing unit to construct a sparse forward-backward matrix from one or more sparse measurement array vectors and to generate beamforming outputs of a completed virtual array aperture by performing forward-backward matrix completion processing of the sparse forward-backward matrix to construct a completed forward-backward matrix by filling holes in the sparse MIMO virtual array aperture to suppress spurious sidelobes caused by holes in the sparse forward-backward matrix, thereby enabling computation of one or more super resolution direction of arrival (DoA) estimation values based on the completed forward-backward matrix.

23 Claims, 26 Drawing Sheets

(56) References Cited

OTHER PUBLICATIONS

Benjamin Friedlander et al., Direction Finding for Wide-Band Signals Using an Interpolated Array, IEEE Transactions on Signal Processing, vol. 41, No. 4, Apr. 1993.

Per Hyberg et al., Array Interpolation and Bias Reduction, IEEE Transactions on Signal Processing, vol. 52, No. 10, Oct. 2004.

Per Hyberg et al., Array Interpolation and DOA MSE Reduction, IEEE Transactions on Signal Processing, vol. 53, No. 12, Dec. 2005.

Bk Lau et al., An Improved Array Interpolation Approach to DOA Estimation in Correlated Signal Environments, IEEE 2004 International Conference on Acoustics, Speech, and Signal Processing, 2004.

T. Kaya Yasar et al., Wideband DOA Estimation for Nonuniform Linear Arrays With Wiener Array Interpolation, 2008 5th IEEE Sensor Array and Multichannel Signal Processing Workshop, 2008.

Marco A.M. Marinho et al., Unscented Transformation Based Array Interpolation, 2015 IEEE International Conference on Acoustics, Speech and Signal Processing (ICASSP), 2015.

Shunqiao Sun et al., 4D Automotive Radar Sensing for Autonomous Vehicles: A Sparsity-Oriented Approach, IEEE Journal of Selected Topics in Signal Processing, vol. 15, No. 4, Jun. 2021.

Shuimei Zhang et al., DOA Estimation Exploiting Interpolated Multi-Frequency Sparse Array, 2020 IEEE 11th Sensor Array and Multichannel Signal Processing Workshop (SAM), 2020.

Shunqiao Sun et al., Four-Dimensional High-Resolution Automotive Radar Imaging Exploiting Joint Sparse-Frequency and Sparse-Array Design, ICASSP 2021—2021 IEEE International Conference on Acoustics, Speech and Signal Processing (ICASSP), 2021.

Shuimei Zhang et al., Enhanced DOA Estimation Exploiting Multi-Frequency Sparse Array, IEEE Transactions on Signal Processing, vol. 69, 2021.

Chengwei Zhou et al., Direction-of-Arrival Estimation for Coprime Array via Virtual Array Interpolation, IEEE Transactions on Signal Processing, vol. 66, No. 22, pp. 5956-5971, Nov. 15, 2018.

Jian-Feng Cai et al., Singular Value Thresholding Algorithm for Matrix Completion, SIAM Journal on Optimization, vol. 20, Issue 4, 2010.

Zai Yang et al., New Low Rank Optimization Model and Convex Approach for Robust Spectral Compressed Sensing, arXiv:2101.06433 [cs.IT], Jan. 16, 2021.

Zai Yang et al., Forward-Backward Hankel Matrix Fitting for Spectral Super-Resolution, 2020 28th European Signal Processing Conference (EUSIPCO), 2021.

\* cited by examiner

MIMO VIRTUAL ANTENNAS AND FORMED SPARSE ARRAY (HOLES ARE ZERO-FILLED) 18

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|----|----|----|----|----|----|----|----|----|----|----|----|----|----|----|----|----|----|----|
| v | 0 | v | 0 | v | 0 | v | 0 | 0 | v  | 0  | v  | v  | 0  | 0  | v  | v  | v  | 0  | 0  | 0  | v  | 0  | 0  | 0  | 0  | 0  | v  |

⇩ FORWARD AND BACKWARD HANKEL MATRIX CONSTRUCTION $$\mathbf{H}_{FB} = \begin{bmatrix} x_1 & \square & \cdots & \square \\ \vdots & \ddots & \ddots & \vdots \\ \cancel{x_{15}} & \square & \ddots & x_{28} \\ x_{16} & x_{17} & \cdots & x_{28} \end{bmatrix} \begin{bmatrix} x_{28}^* & \square & \cdots & x_1^* \\ \cancel{x_{27}^*} & \square & \ddots & \vdots \\ \vdots & \ddots & \ddots & x_{22}^* \\ x_{23}^* & x_{22}^* & \cdots & x_1^* \end{bmatrix}$$

FORWARD HANKEL  BACKWARD HANKEL

MISSING ANTI-DIAGONALS (CROSSED OUT ELEMENTS) OF THE HANKEL MATRIX ARE FILLED WITH ZEROS.

THE RESULTING FORWARD-BACKWARD HANKEL MATRIX DOES NOT CONVEY TARGET DOA INFORMATION.

⇩ (ESTIMATION CANNOT BE PERFORMED CORRECTLY)

FORWARD-BACKWARD HANKEL-BASED SUPER-RESOLUTION ANGULAR-DOMAIN SPECTRAL ANALYSIS 19
(E.G. SUPER MATRIX PENCIL DOA ESTIMATION ALGORITHM)

⇧ TARGET DOAS (ERRONEOUS ESTIMATES)

Figure 3B

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|----|----|----|----|----|----|----|----|----|----|----|----|----|----|----|----|----|----|----|
| v | 0 | v | 0 | v | 0 | v | 0 | 0 | 0  | 0  | v  | v  | 0  | 0  | v  | v  | v  | 0  | 0  | 0  | v  | 0  | 0  | 0  | 0  | 0  | v  |

MIMO VIRTUAL ANTENNAS AND FORMED SPARSE ARRAY (HOLES ARE ZERO-FILLED) 91

⇩ FORWARD BACKWARD HANKEL MATRIX COMPLETION 92

$$\hat{\mathbf{H}}_{FB} = \begin{bmatrix} \hat{x}_1 & \cdots & \square & \square \\ \vdots & \ddots & \ddots & \vdots \\ \hat{x}_{15} & \cdots & \square & \hat{x}_{28} \\ \hat{x}_{16} & \hat{x}_{17} & \cdots & \hat{x}_{28} \end{bmatrix} \begin{bmatrix} \hat{x}_{28}^* & \cdots & \square & \hat{x}_1^* \\ \vdots & \ddots & \ddots & \vdots \\ \hat{x}_{24}^* & \cdots & \square & \square \\ \hat{x}_{23}^* & \hat{x}_{22}^* & \cdots & \hat{x}_1^* \end{bmatrix}$$

FORWARD HANKEL          BACKWARD HANKEL

NOISE-RANK-REDUCED FORWARD-BACKWARD HANKEL MATRIX CONVEYS TARGET DOA INFORMATION 93

⇩ FORWARD-BACKWARD HANKEL-BASED SUPER-RESOLUTION ANGULAR-DOMAIN SPECTRAL ANALYSIS 94

(E.G. SUPER MATRIX PENCIL DOA ESTIMATION ALGORITHM)

⇧ TARGET DOAS 95

Figure 9

MIMO VIRTUAL ANTENNAS AND FORMED SPARSE ARRAY (HOLES ARE ZERO-FILLED) 111

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|----|----|----|----|----|----|----|----|----|----|----|----|----|----|----|----|----|----|----|
| v | o | o | v | v | o | v | v | v | o  | o  | v  | v  | v  | o  | v  | v  | v  | o  | o  | v  | v  | o  | o  | o  | o  | v  | v  |

TOP-BOTTOM CONCATENATED FORWARD BACKWARD HANKEL MATRIX CONSTRUCTION 112

$$\mathbf{H}_{FB} = \begin{bmatrix} x_1 & \cdots & x_8 & x_9 & \cdots & x_{27} & x_{28} \\ \vdots & \ddots & x_9 & x_{10} & \cdots & x_{28} & 0 \\ x_8 & \cdots & \cdots & \cdots & \cdots & 0 & \cdots \\ \hline x_{28}^* & \cdots & x_{21}^* & x_{20}^* & \cdots & x_2^* & x_1^* \\ \vdots & \ddots & x_{20}^* & x_{19}^* & \cdots & x_1^* & 0 \\ x_{21}^* & \cdots & \cdots & \cdots & \cdots & 0 & \cdots \end{bmatrix}$$

113A, 113B, 113C, 113D

MATRIX COMPLETION VIA MEASUREMENT-PRESERVING RANK MINIMIZATION OR NUCLEAR-NORM MINIMIZATION PROCESSES 114

$$\hat{\mathbf{H}}_{FB} = \begin{bmatrix} \hat{x}_1 & \cdots & \hat{x}_8 & \hat{x}_9 & \cdots & \hat{x}_{27} & \hat{x}_{28} \\ \vdots & \ddots & \hat{x}_9 & \hat{x}_{10} & \cdots & \hat{x}_{28} & \\ \hat{x}_8 & \cdots & & & & & \\ \hline \hat{x}_{28}^* & \cdots & \hat{x}_{21}^* & \hat{x}_{20}^* & \cdots & \hat{x}_2^* & \hat{x}_1^* \\ \vdots & \ddots & \hat{x}_{20}^* & \hat{x}_{19}^* & \cdots & \hat{x}_1^* & \\ \hat{x}_{21}^* & \cdots & & & & & \end{bmatrix}$$

115A, 115B

THE COMPLETED $\hat{\mathbf{H}}_{FB}$ CAN BE USED DIRECTLY FOR SUPER-RESOLUTION DOA ESTIMATION, OR THE COMPLETED ARRAY MEASUREMENTS CAN BE EXTRACTED FROM $\hat{\mathbf{H}}_{FB}$ FOR OTHER TYPE OF ANGULAR SPECTRAL ANALYSES. IN THE SECOND CASE, THE FORWARD AND BACKWARD ARRAY MEASUREMENT VECTORS CAN BE AVERAGED OR PROCESSED INDEPENDENTLY FOR CONSISTENCY CHECK OR FOR APODIZATION.

FORWARD ARRAY MEASUREMENT VECTOR 116

INDEX-REVERSING AND COMPLEX CONJUGATE 117

BACKWARD ARRAY MEASUREMENT VECTOR 118

SUPER-RESOLUTION MIMO SPARSE ARRAY AUTOMOTIVE RADAR BASED ON FORWARD AND BACKWARD HANKEL MATRIX COMPLETION

BACKGROUND OF THE INVENTION

Field of the Invention

The present invention is directed in general to radar systems and associated methods of operation. In one aspect, the present invention relates to estimating a direction of arrival (DoA) of target radar signal reflections at an automotive radar system.

Description of the Related Art

Radar systems may be used to detect the location and velocity of nearby targets. With advances in technology, radar systems may now be applied in many different applications, such as automotive radar safety systems, but not every radar system is suitable for every application. For example, 77 GHz Frequency Modulation Continuous Wave (FMCW) Fast Chirp Modulation (FCM) radars are used as primary sensors in Advanced Driver Assistance System (ADAS) and are used as safety sensors in autonomous driving (AD) systems, but are not used as the primary sensor in AD systems due to limited angular resolution performance. To enable the use of such radar systems as the primary sensor for driver replacement in AD systems, such systems must provide better angular resolution, but this typically requires larger antenna apertures, and therefore physically larger radars. Unfortunately, the requirement of having larger radars can conflict with other design and/or operational constraints, such as integrating a large aperture radar into a vehicle which has competing requirements for design, structure, and/or operation. For example, the front of a vehicle may have design or structural elements (e.g., headlights, design emblems, bumpers, etc.) that do not readily admit the addition of a large aperture radar. Keeping the size of radar sufficiently small so it can be integrated with other parts of the vehicle implies that the aperture of the radar is constrained and thus the angular resolution is limited. A second limitation on larger arrays is the cost. Populating any sizable aperture fully with antenna elements may require thousands of antennas and is very costly. So, it is often desirable to invoke a design that is not fully populated, and allows for holes in the final constructed aperture via mono-static, bi/multi-static, and multiple-input-multiple-output (MIMO) approaches. Such antenna array design is referred to as the sparse array design.

Existing radar systems have attempted to address these challenges by using techniques which populate the aperture sparsely, and/or effectively combine a plurality of distributed, smaller aperture radars to form a larger virtual aperture. To form a larger, combined array aperture from the smaller aperture radars, missing or sparse antenna apertures can be filled with virtual elements to achieve better sensitivity, finer angular resolution, and low false detection rate, resulting in very fine angular resolution. However, there are challenges associated with sparse arrays which may have high sidelobes that can introduce angular ambiguity in terms of identifying direction of arrival (DoA) targets. While interpolation techniques, such as linear regression, transform matrix, matrix completion or matrix reconstruction approaches, can be applied to interpolate the missing elements in the sparse arrays, such existing techniques suffer from performance limitations and/or computational complexity that make such solutions unsuitable for current and future needs. For example, the linear regression approach usually requires a uniform linear subarray in order to estimate the prediction coefficients. And while the transform matrix approach usually works well for a narrow field of view (FOV), wider FOVs require a sector-based transformation. Matrix completion approaches are not constrained by uniform array geometry and provide flexibility in designing the sparse array geometries such that the missing elements can be filled by solving a low-rank matrix completion problem by computing singular value decomposition (SVD) for each iteration or by employing faster algorithms like singular value thresholding (SVT).

BRIEF DESCRIPTION OF THE DRAWINGS

The present invention may be understood, and its numerous objects, features and advantages obtained, when the following detailed description of a preferred embodiment is considered in conjunction with the following drawings.

FIG. 3B illustrates an example sparse linear array of antenna elements being processed to form a failed forward backward Hankel matrix that cannot be used with a single-snapshot super-resolution coherent target DoA estimation.

FIG. 9 is a simplified diagrammatic depiction illustrating direct application of forward backward Hankel matrix completion processing to a sparse array to form forward backward Hankel matrix used with super-resolution coherent target DoA estimation in accordance with selected embodiments of the present disclosure.

FIG. 10B is a simplified diagrammatic depiction of a top-bottom concatenated forward backward Hankel matrix which is processed for matrix completion using measurement-preserving rank minimization processing to form a completed forward backward Hankel matrix in accordance with selected embodiments of the present disclosure.

FIG. 10D is a simplified diagrammatic depiction of a top-bottom concatenated forward backward Toeplitz matrix which is processed for matrix completion using measurement-preserving rank minimization processing to form a completed forward backward Toeplitz matrix in accordance with selected embodiments of the present disclosure.

DETAILED DESCRIPTION

Figure 1A:
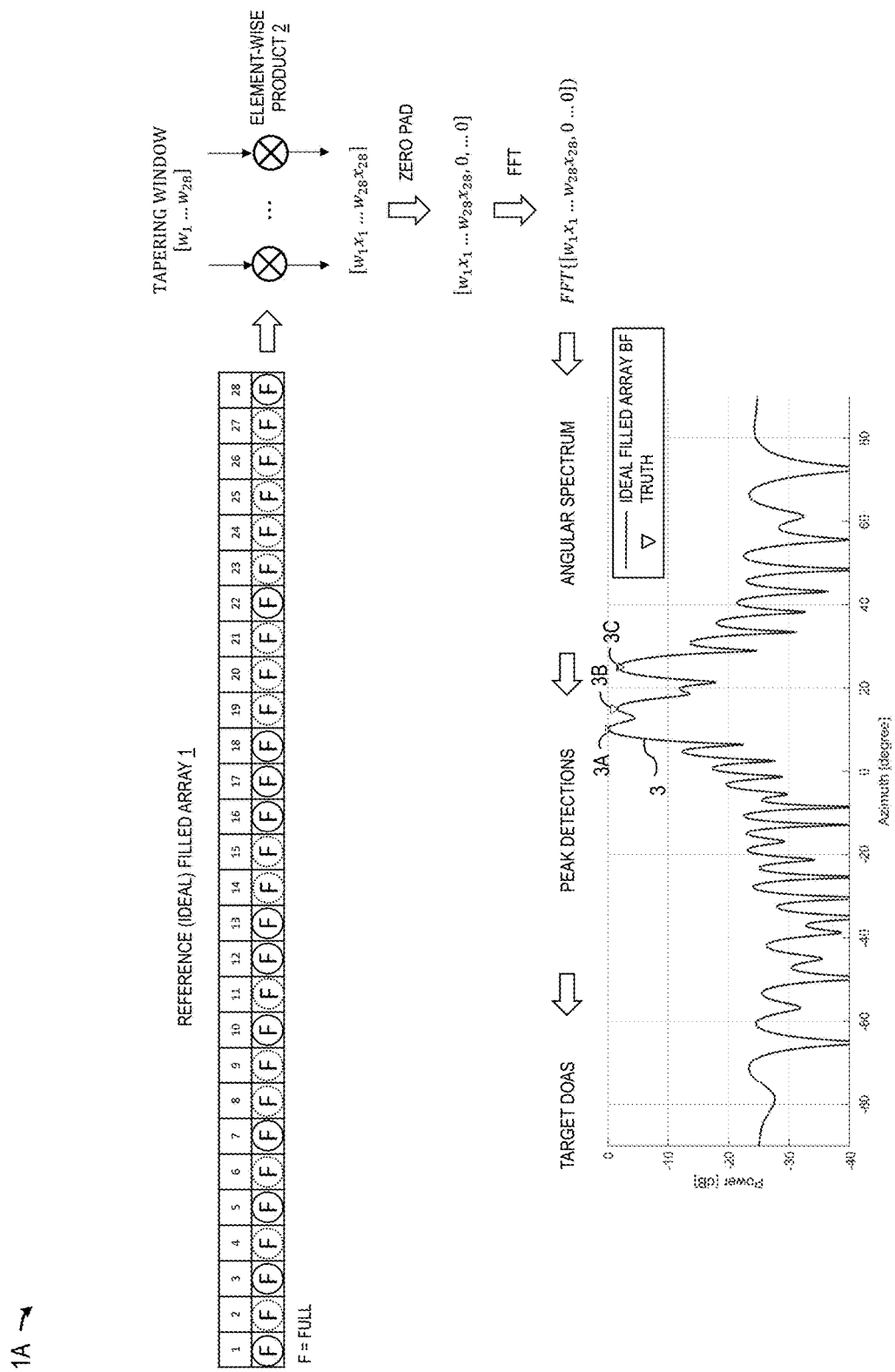
FIG. 1A illustrates an example filled uniform linear array of antenna elements being processed to generate a beamforming output for target DoA estimation.

A distributed aperture radar system, hardware circuit, system, architecture, and methodology are described for performing fast forward-backward matrix completion processing to compute joint array interpolation values that enable super resolution angle finding. By exploiting the structure of Hankel or Toeplitz matrices, the matrix completion processing enables the construction of a low-rank matrix with larger dimensions, thereby enabling more targets to be completed and estimated with better accuracy. In selected first embodiments, a signal processing methodology and algorithm are disclosed for performing forward backward Hankel matrix completion with a left-right concatenated forward backward Hankel matrix by using measurement-preserving rank minimization processing or nuclear-norm minimization processing. In selected second embodiments, a signal processing methodology and algorithm are disclosed for performing forward backward Hankel matrix completion with a top-bottom concatenated forward backward Hankel matrix by using measurement-preserving rank minimization processing or nuclear-norm minimization processing. In selected third embodiments, a signal processing methodology and algorithm are disclosed for performing forward backward Toeplitz matrix completion with a left-right concatenated forward backward Toeplitz matrix by using measurement-preserving rank minimization processing or nuclear-norm minimization processing. In selected fourth embodiments, a signal processing methodology and algorithm are disclosed for performing forward backward Toeplitz matrix completion with a top-bottom concatenated forward backward Toeplitz matrix by using measurement-preserving rank minimization processing or nuclear-norm minimization processing. In addition or in the alternative, an apodized sparse array angle spectrum may be generated from a completed forward backward Hankel/Toeplitz matrix to detect targets that are not separable by beamforming and to eliminate false targets in accordance with selected embodiments of the present disclosure.

In accordance with selected embodiments of the present disclosure, a MIMO sparse array radar system delivers super-resolution DoA estimates by employing forward and backward Hankel matrix completion processing to generate the measurements of the missing elements of the sparse array to construct a filled uniform array, and by applying super-resolution DoA estimation algorithm to estimate the angular information of targets using the completed uniform array measurements. To this end, the MIMO sparse array radar system may include Tx and Rx antennas that form a Multiple-Input Multiple-Output (MIMO) sparse virtual array geometry, along with Tx and Rx circuits and processing circuits to produce MIMO virtual array measurements on target reflections. In addition, the MIMO sparse array radar system includes processing circuits and/or logic that arrange the array measurements into a forward and backward Hankel Matrix (FBHM) of the size of the filled array with the missing elements zero-filled. The MIMO sparse array radar system also includes processing circuits and/or logic that complete the FBHM iteratively by means of rank minimization. In addition, the MIMO sparse array radar system includes processing circuits and/or logic that computes estimated target direction of arrival (DoA) values based on the completed FBHM, where the estimated target DoA values are output over a data interface to other automotive radar perception processing and vehicle control systems.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure the radial distance and direction to a reflecting object and its relative radial velocity, and are characterized by performance criteria, such as the angular resolution (the minimum distance between two targets at the same range and range rate (or radial velocity) resolution cell which a radar is able to distinguish and separate to each other), range resolution, sensitivity, false detection rate, and the like. Typically, frequency modulated continuous wave (FMCW) modulation techniques are used to identify the location and/or velocity of a radar target, such as a car or pedestrian, by transmitting FMCW modulated signals from multiple transmit antennas so that reflected signals from the radar target are received at multiple receive antennas and processed to determine the radial distance and relative radial velocity and direction for the radar target. This can be achieved with a mono-static radar operating under the MIMO principle that forms a virtually large but sparse aperture for estimating target's DoA information, or it can be achieved via a bi/multi-static radar system to form an even larger sparse virtual aperture. With current automotive designs, a vehicle can include multiple radars which operate independently from one another in a mono-static manner. Typically when operating under the mono-static mode, one radar's transmissions are not used by any other radars, and are instead treated as interferences which need to be avoided or suppressed to prevent interference. Alternatively when operating under the bi/multi-static mode, the outputs from individual radars are used independently or integrated in a non-coherent fashion or fused by the tracker. Techniques for non-coherently combining multiple front-end system-on-chip devices are known in literature, but non-coherent integration or track fusion does not increase the system angular performance.

One way to increase angular performance is to combine distributed apertures to form a larger aperture. Typically, such systems require that the distributed radars share a common reference local oscillator (LO) signal so that the radars operate on the same frequency and time reference, but there are often situations where car integration constraints prevent such common reference LO signal connections from being robustly and economically implemented. As an alternative to physically sharing the LO signal, distributed apertures can also be combined in systems, such as bi-static radar systems, that form a single large aperture by having each radar receive the other radars' transmissions and then cross-correlate the target returns with the received transmissions from the other radars for estimating target parameters. While multi-static radar techniques are known, such approaches require relatively complex and expensive modifications to existing automotive radar transceiver hardware and software because of the lack of the dedicated cross-correlator circuitry for the reference signal.

Another alternative is provided by Frequency Modulation Continuous Wave (FMCW) Fast Chirp Modulation (FCM) radars that are used as safety sensors in many Advanced Driver Assistance Systems (ADAS), but to provide sufficient angular resolution capability, such radar systems require large antenna apertures that present challenges for car integration. This dilemma can be overcome by forming a virtually large aperture from a physically smaller and sparsely populated antenna array, but such solutions require many complex calculations that are not suitable for implementation with software due the huge computational overhead and resulting processing time requirements. For example, high-resolution automotive imaging radars employ super-resolution techniques which use computational and algorithmic enhancements to resolve targets that are not separable with the "natural" or physical radar apertures, thereby achieving angular resolution that is superior to the natural resolution provisioned by the physical aperture of the antenna array of the radar system. However, because existing super-resolution techniques require uniform spacing of the virtual antenna array formed via Multiple-Input Multiple-Output (MIMO) processing, such super-resolution techniques cannot be directly applied to an arbitrary sparse array. For radars with sparse array designs, what is needed is a way to fill the missing elements first such that conventional super resolution direction of arrival (DoA) estimation techniques can be applied.

To achieve desired resolution while meeting stringent Size, Weight, Power and Cost (SWaP-C) requirements, MIMO virtual array approaches are often coupled with sparse array designs to generate outputs that are processed by super-resolution direction of arrival (DoA) estimation algorithms to produce high resolution angular target information with as few transmit Tx and receive Rx channels occupying as small a physical size as possible. However, there are several issues with estimating target DoA using measurements taken from a sparse array which is basically a filled uniform array with missing elements. As a result, there is not a uniform sampling in the spatial domain, and this can result in angular ambiguity. In turn, the ambiguity caused by spatial under sampling directly causes the sidelobes to rise up in the digital beamforming output. The issue of raised sidelobes can be mitigated if the missing elements of the sparse array are filled by interpolation.

Figure 1B:
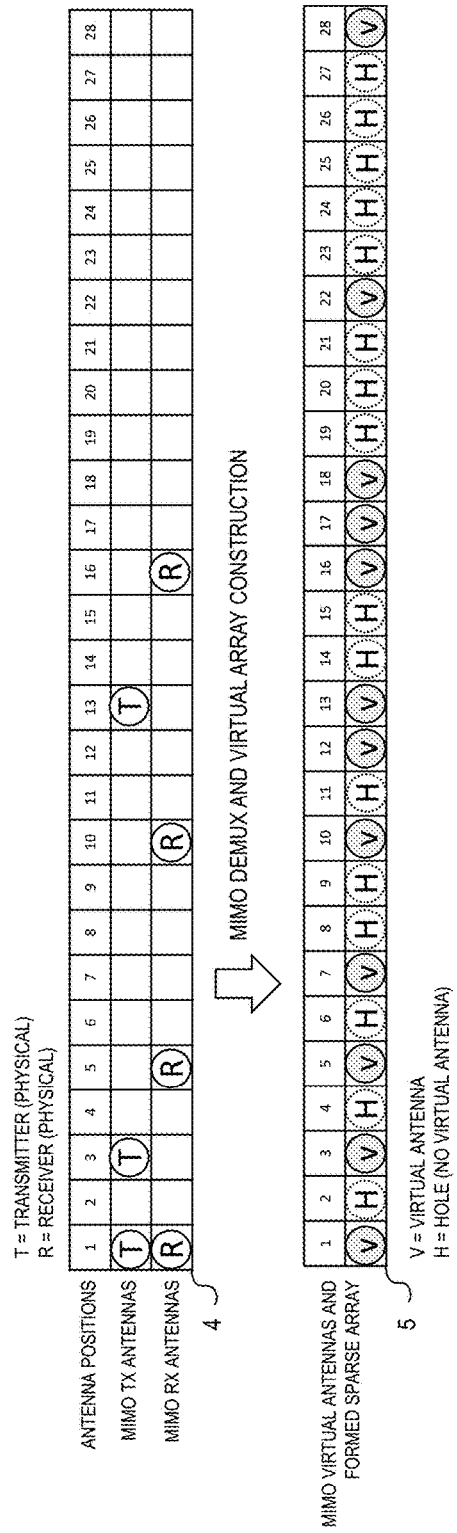
FIG. 1B illustrates an example sparse array of 12 virtual antennas formed from 3 MIMO Tx and 4 MIMO Rx antennas.
Figure 1C:
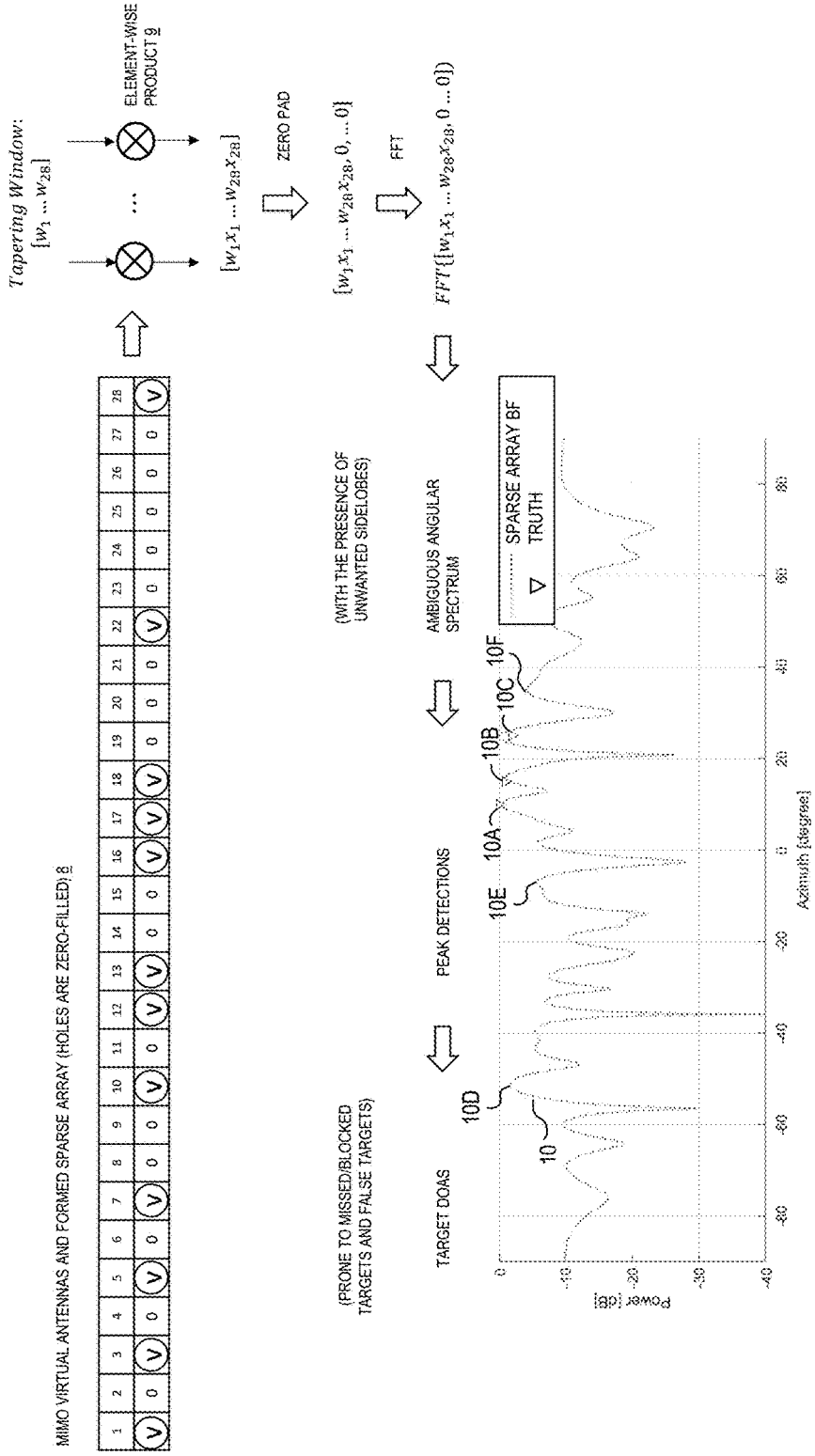
FIG. 1C illustrates an example sparse linear array of virtual antenna elements being processed to generate a beamforming output with ambiguity sidelobes which can cause erroneous target DoA estimation.

To illustrate the first issue caused by computing target DoA estimation from sparse arrays, reference is now made to FIGS. 1A-C which illustrate how raised sidelobes can be created from a sparse linear array of antenna elements. As a starting point to illustrate how an ideal or reference filled array can be used to generate a beamforming output with suppressed sidelobes, FIG. 1A depicts a uniformly filled reference (ideal) linear array 1 of antenna elements that generates a target return receive vector which is processed to produce a digital beamforming output 3 for target DoA estimation based on angular spectrum estimation computations. In the example, the uniformly filled reference (ideal) linear array 1 is formed with 28 uniformly spaced antenna elements, where the physical presence of each antenna element is indicated with an "F" to indicate the antenna element is Filled (as opposed to missing Hole (H) or Virtual (V) antenna elements). The depicted target returns from the reference filled array 1 are processed as a receive vector $[x_1, \ldots x_{28}]$ by using an element-wise multiplier 2 to apply a set of tapering window values $[w_1, \ldots w_{28}]$, thereby generating an output product $[w_1x_1, \ldots w_{28}x_{28}]$. Next, any required zero padding is added to the vector product so that the padded product vector has the next power of 2 number of elements $[w_1x_1, \ldots w_{28}x_{28}, 0, \ldots]$ before being transformed (e.g., using zero-padding FFT) to generate the FFT-transformed vector $(FFT\{[w_1x_1, \ldots w_{28}x_{28}, 0, \ldots 0]\})$. By plotting the FFT-transformed vector, the resulting beamforming output signal 3 for the ideal filled array beamformer shows the angular spectrum for three targets 3A-3C wherein three distinct peaks from the spectrum 3 can be detected and processed to estimate the direction of arrival (DoA) values for the targets.

Due to real world constraints, it is not always possible to include large, uniformly spaced antenna arrays. For example, in automotive applications, it may not be cost effective or even physically possible to include a large array of uniformly spaced transmit/receive antennas on the front or side(s) of the vehicle. Instead, it is typical to use a small number non-uniformly spaced transmit/receive antennas to form a "sparse" linear array of virtual antennas that has the same aperture size as the ideal or reference filled array. An example of a sparse array is illustrated in FIG. 1B which depicts a physical array 4 of three transmit TX antennas and four receive RX antennas which are non-uniformly distributed, respectively, at transmit antenna positions 1, 3 and 13 and receive antenna positions 1, 5, 10, and 16. Using any suitable MIMO demultiplexing and virtual array construction techniques, the 3T4R MIMO radar system may be used to construct a sparse array 5 of equal aperture with twelve virtual antenna elements, where the presence of each virtual antenna element is indicated with a "V" and where the missing antenna element holes are indicated with an "H". Since there are holes in the constructed array 5 at antenna positions 2, 4, 6, 8-9, 11, 14-15, 19-21, and 23-27, it is "sparse" array, but the overall aperture size is the same as the uniformly filled reference (ideal) linear array 1 shown in FIG. 1A.

Unfortunately, sparse arrays can create raised sidelobes that interfere with accurate target DoA estimation. This is illustrated in FIG. 1C which depicts an example sparse linear array 8 of virtual antenna elements which generate a beamforming output 10 with ambiguity sidelobes 10D-F which can cause erroneous target DoA estimation based on angular spectrum estimation computations. In the example, the MIMO virtual antennas form a sparse linear array 8 with non-uniformly spaced virtual antenna elements V and with zero-filled holes at the indicated antenna positions. The depicted target returns from the sparse linear array 8 are processed as a receive vector $[x_1, \ldots x_{28}]$ by using an element-wise multiplier 9 to apply a set of tapering window values $[w_1, \ldots w_{28}]$, thereby generating an output product $[w_1x_1, \ldots w_{28}x_{28}]$ which is zero padded to generate a padded product vector $[w_1x_1, \ldots w_{28}x_{28}, 0, \ldots 0]$ before being transformed (e.g., using zero-padding FFT) to generate the FFT-transformed vector $(FFT\{[w_1x_1, \ldots w_{28}x_{28}, 0, \ldots 0]\})$. By plotting the FFT-transformed vector, the resulting beamforming output signal 10 for the sparse array shows an ambiguous angular spectrum wherein unwanted sidelobes 10D-F can obscure the detection of the three targets 10A-10C, potentially resulting in missed or blocked targets, false target detection and/or blanking of weak targets. As seen from the contrast with FIG. 1A, the sidelobes can be suppressed by using a uniformly filled linear array. However, it will be appreciated that such FFT-based digital beamforming angular spectrum estimation techniques have limited angular resolution capabilities, meaning the multiple targets can be located within a single peak.

Figure 2A:
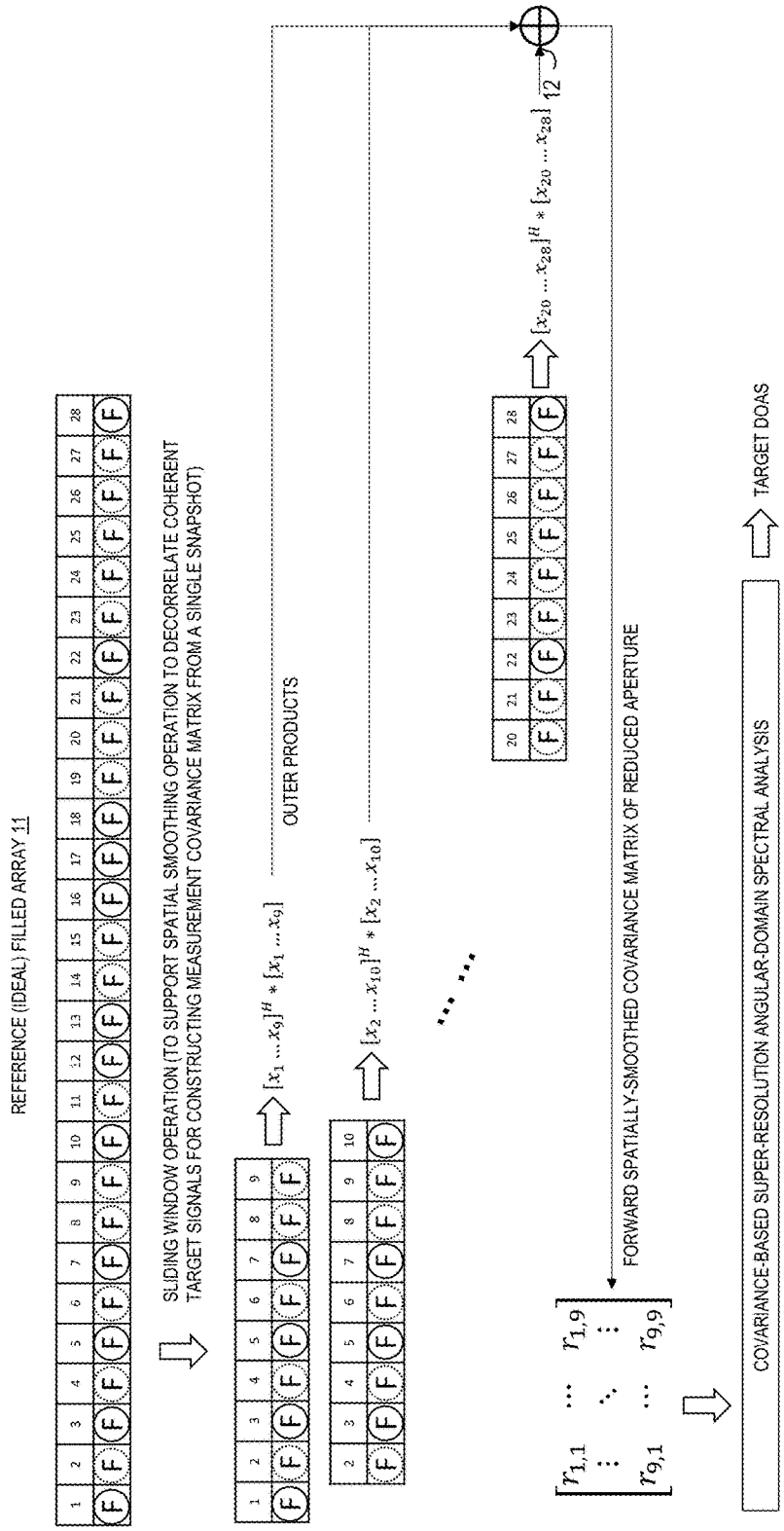
FIG. 2A illustrates an example filled uniform linear array of antenna elements being processed with a sliding window to form a forward-only spatial smoothing covariance matrix used with super-resolution coherent target DoA estimation.

To resolve targets that are not separable with their natural apertures, super-resolution DoA estimation techniques may be used to produce high resolution angular target information with a smaller number of Tx and Rx channels occupying as small a physical size as possible. While there are a variety of super-resolution DoA estimation techniques, reference is now made to FIG. 2A which illustrates an example filled uniform linear array 11 of antenna elements that generates a target return receive vector which is processed with a sliding window to form a forward-only spatial smoothing covariance matrix used with super-resolution coherent target DoA estimation. In the example, the uniformly filled reference (ideal) linear array 11 is formed with 28 uniformly spaced filled antenna elements, where the physical presence of each antenna element is indicated with an "F" to indicate the antenna element is Filled. The depicted target returns from the reference filled array 11 are processed as a receive vector $[x_1, \ldots x_{28}]$ by applying a sliding window operation to a subset of the receive vector elements (e.g., $[x_1 \ldots x_9]$) to compute the outer product vector from the subset of the receive vector elements times the conjugate transpose of the subset of the receive vector elements (e.g., Outer Product= $[x_1 \ldots x_9]^{H*}[x_1 \ldots x_9]$). The application of the sliding window computation of outer products supports spatial smoothing operations to decorrelate coherent target signals for constructing a measurement covariance matrix from a single snapshot. By using the sliding window to compute outer products across the receive vector $[x_1, \ldots x_{28}]$, the outer products may be summed at the adder 12 to generate a forward spatially-smoothed covariance matrix having a reduced aperture. As will be appreciated, a backward spatially-smoothed covariance matrix can be generated by reversing the index order of the receive vector (e.g., $[x_{28}, \ldots x_1]$) and applied with complex conjugation before applying the sliding window computation and sum of outer products. Either way, the forward (or backward) spatially-smoothed covariance matrix may be processed with a super-resolution angular-domain spectral analysis algorithm (e.g., MUSIC or ESPRIT or Super Matrix Pencil) to identify target DoA values.

Figure 2B:
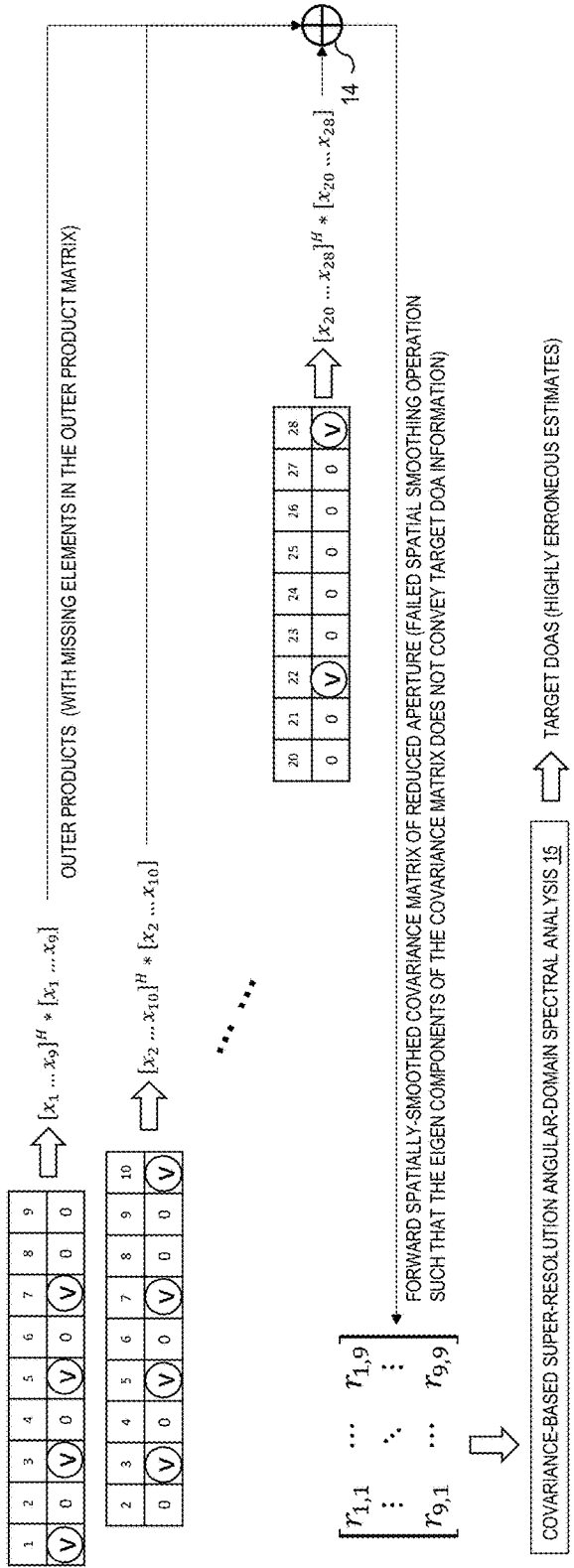
FIG. 2B illustrates an example sparse linear array of antenna elements being processed with a sliding window to form a failed forward-only spatial smoothing covariance matrix that cannot be used with super-resolution target DoA estimation.

Unfortunately, a requirement for existing super-resolution angular-domain spectral analysis algorithms is that they require a uniformly spaced virtual antenna array formed via Multiple-Input Multiple-Output (MIMO) processing, so they cannot be applied to sparse array directly. For example, conventional super-resolution DoA algorithms require the formation of a forward-only or forward-backward spatially smoothed covariance matrix of the antenna array measurements wherein a uniform array geometry is required. Alternatively, Hankel or Toeplitz matrices can be constructed out of the array measurement vector, but such matrices must also have a uniform array geometry for super-resolution DoA algorithms. Given the uniform array requirement, sparse arrays cannot be directly processed by super-resolution DoA algorithms. To illustrate the challenge posed by applying super-resolution DoA algorithms to a sparse antenna array, reference is now made to FIG. 2B which depicts an example sparse linear array 13 of antenna elements that generates a target return receive vector which is processed with a sliding window to form a failed forward-only spatial smoothing covariance matrix that cannot be used with super-resolution coherent target DoA estimation. In the example, the sparse linear array 13 is formed with twelve virtual antenna elements, where the presence of each virtual antenna element is indicated with a "V" (e.g., at antenna positions 2, 4, 6, 8-9, 11, 14-15, 19-21, and 23-27), and where the missing antenna element holes are filled with zero "0" values. The depicted target returns from the reference filled array 13 are processed as a receive vector $[x_1, \ldots x_{28}]$ by applying a sliding window operation to each subset of the receive vector elements (e.g., $[x_1 \ldots x_9]$) to compute the outer product vector from the subset of the receive vector elements times the conjugate transpose of the subset of the receive vector elements (e.g., Outer Product=$[x_1 \ldots x_9]^{H*}[x_1 \ldots x_9]$), and then summing the computed outer products at the adder 14 to generate a forward spatially-smoothed covariance matrix having a reduced aperture. However, when there are missing elements in the sparse array 13, the depicted processing steps—for using sliding window subarray sampling to compute and sum outer products to form the final covariance matrix—result in the computation of the outer product matrix which includes missing elements (or zeroes), causing failure of the spatial smoothing operation. And since the eigen components of the covariance matrix fail to convey target DoA information, the covariance-based single-snapshot super-resolution angular-domain spectral analysis 15 produces coherent target DoA estimation results that are highly erroneous and broken.

Figure 3A:
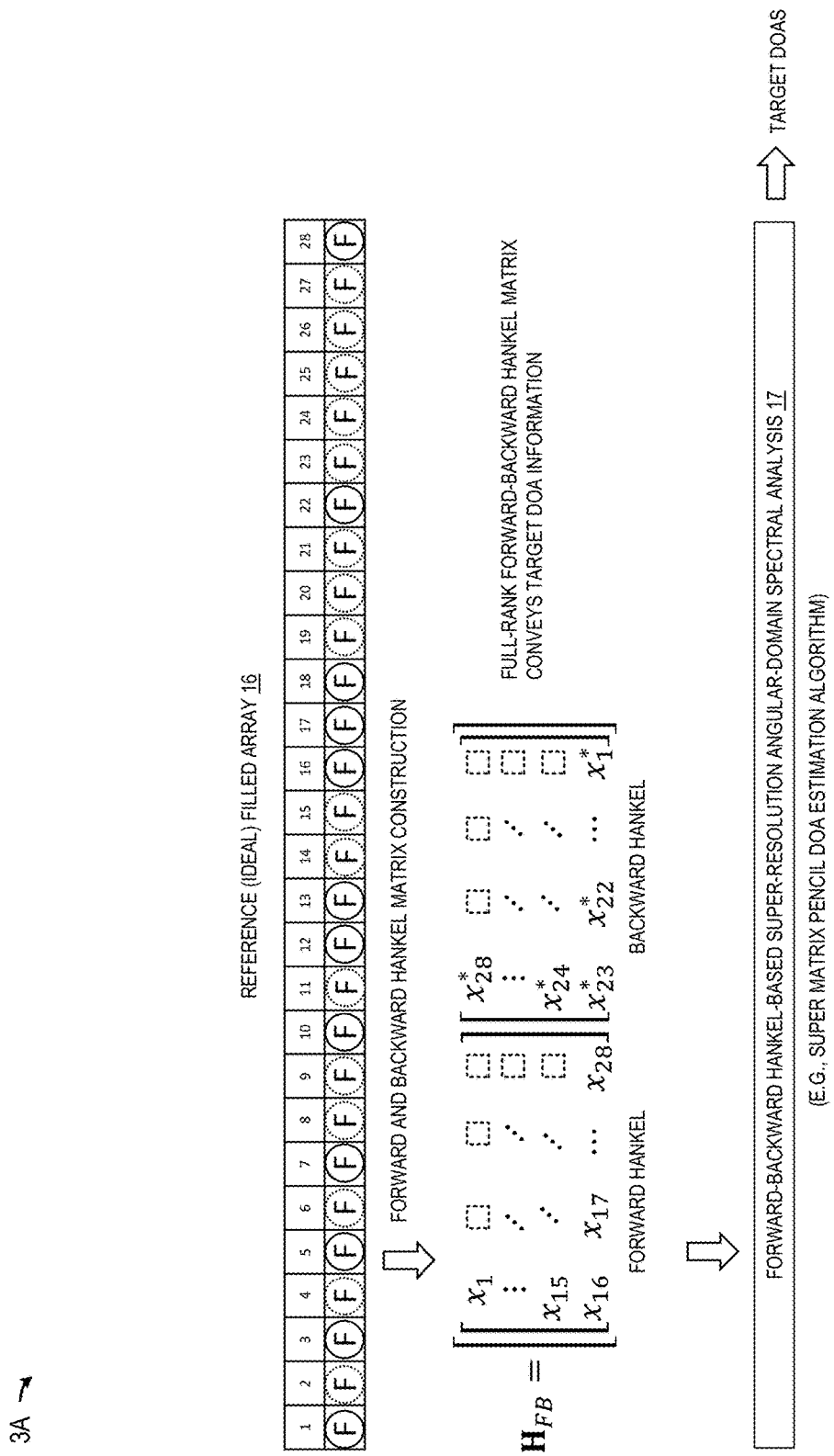
FIG. 3A illustrates an example filled uniform linear array of antenna elements being processed to form a forward backward Hankel matrix used with a single-snapshot super-resolution coherent target DoA estimation.

To illustrate another example of the challenge posed by using sparse arrays with super-resolution angular-domain spectral analysis algorithms, reference is now made to FIG. 3a which depicts an example filled uniform linear array of antenna elements 16 that generates a target return receive vector which is processed to form a forward backward Hankel matrix used with a single-snapshot super-resolution coherent target DoA estimation. In the example, the uniformly filled reference (ideal) linear array 16 is formed with 28 uniformly spaced filled antenna elements, where the physical presence of each antenna element is indicated with an "F" to indicate the antenna element is Filled. The depicted target returns from the reference filled array 16 are processed as a receive vector $[x_1, \ldots x_{28}]$ to construct a forward and backward Hankel matrix $H_{FB}$ using any suitable technique. For example, the forward-backward Hankel matrix may include or refer to a matrix having multiple concatenated sub-matrices, where each sub-matrix may be characterized as a diagonal-constant matrix having a diagonal direction consistent with ascending diagonal from left to right being constant (e.g., Hankel-like). As will be appreciated, the forward-backward Hankel matrix may be constructed in a variety of manners and may include respective forward and backward matrices having the same number of rows and columns. For example, a forward Hankel matrix may be constructed by bending the receive vector (e.g., $[x_1, \ldots x_{28}]$) to make a right angle that fills the first (or leftmost) column and the last (or bottom) row of the forward Hankel matrix, followed by populating the anti-diagonals with identical values established by the first (or leftmost) column and the last (or bottom) row. As depicted in FIG. 3A, a first portion of the receive vector (e.g., $[x_1, \ldots x_{16}]$) may be used to fill the first (or leftmost) column of the forward Hankel matrix, and a second portion of the receive vector (e.g., $[x_{17}, \ldots x_{28}]$) may be used to fill the remainder of the last or bottom row of the forward Hankel matrix. In similar fashion, a reverse Hankel matrix may be constructed by reversing the index order of the receive vector (e.g., $[x_{28}, \ldots x_1]$) and computing the complex conjugate vector values to generate a backward array measurement vector (e.g., $[x^*_{28}, x^*_{27}, \ldots, x^*_1]$) that is bent to make a right angle that fills the first (or leftmost) column and the last (or bottom) row of the reverse Hankel matrix, followed by populating the anti-diagonals with identical values established by the first (or leftmost) column and the last (or bottom) row. As depicted in FIG. 3A, a first portion of the backward array measurement vector (e.g., $[x^*_{28}, x^*_{27}, \ldots, x^*_{23}]$) is used to fill the first (or leftmost) column of the backward Hankel matrix, and a second portion of the backward array measurement vector (e.g., $[x^*_{22}, \ldots, x^*_1]$) is used to fill the remainder of the last or bottom row of the backward Hankel matrix.

Stated more generally, the forward and backward Hankel matrices may be constructed independently from the array measurements from a vector s having N elements:

$$s=[s_1, s_2, \ldots, s_N]^T \text{ or } [s_1, s_2, \ldots, s_L, s_{L+1}, \ldots s_{L+M-1}]^T,$$

wherein $N=L+M-1$, such that two sub-vectors overlapping on the $L^{th}$ element may be formed. These sub-vectors, $[s_1, s_2, \ldots, s_L]^T$ and $[s_L, s_{L+1}, \ldots s_{L+M-1}]^T$, are applied to span the first column and the last row of the forward Hankel matrix, respectively. In addition, the backward Hankel matrix may be formed by index-reversing and complex conjugating the vector s before the construction. Specifically, a backward array measurement vector $\overleftarrow{s}=[\overleftarrow{s}_1, \overleftarrow{s}_2, \ldots, \overleftarrow{s}_N]^T=[s^*_N, s^*_{N-1}, \ldots, s^*_1]^T$ may be formed and two sub-vectors $[\overleftarrow{s}_1, \overleftarrow{s}_2, \ldots, \overleftarrow{s}_L]^T$ and $[\overleftarrow{s}_L, \overleftarrow{s}_{L+1}, \ldots \overleftarrow{s}_{L+M-1}]^T$ are constructed. The backward Hankel matrix may then be constructed by spanning the first column and the last row of the Backward Hankel matrix with the two sub-vectors $[\overleftarrow{s}_1, \overleftarrow{s}_2, \ldots, \overleftarrow{s}_L]^T$ and $[\overleftarrow{s}_L, \overleftarrow{s}_{L+1}, \ldots \overleftarrow{s}_{L+M-1}]^T$ respectively and setting anti-diagonal elements to equal values.

Once constructed, the forward and backward Hankel matrix $H_{FB}$ provides a forward and backward Hankel matrix to convey target DoA information for processing by the super-resolution angular-domain spectral analysis algorithm 17 (e.g., MUSIC or ESPRIT or Super Matrix Pencil) to identify target DoA values.

However, the super-resolution angular-domain spectral analysis algorithms do not work when there are missing elements in the forward and backward Hankel matrix, meaning that DoA estimation cannot be performed. To illustrate the challenge posed by applying super-resolution DoA algorithms to a forward and backward Hankel matrix having missing or zero elements, reference is now made to FIG. 3b which depicts an example sparse linear array 18 of antenna elements that generates a target return receive vector which is processed to form a failed forward backward Hankel matrix that cannot be used with a single-snapshot super-resolution coherent target DoA estimation. In the example, the sparse linear array 18 is formed with twelve virtual antenna elements, where the presence of each virtual antenna element is indicated with a "V" (e.g., at antenna positions 2, 4, 6, 8-9, 11, 14-15, 19-21, and 23-27), and where the missing antenna element holes are filled with zero "0" values. The depicted target returns from the reference filled array 18 are processed as a receive vector $[x_1, \ldots x_{28}]$ to construct a forward and backward Hankel matrix $H_{FB}$ using any suitable technique. However, for any missing antenna elements in the sparse array 18 (e.g., antenna elements $x_{15}, x^*_{24}$), a zero is inserted into the forward backward Hankel matrix at the missing antenna element positions and corresponding anti-diagonal positions. As a result, the forward-backward Hankel matrix-based super-resolution angular-domain spectral analysis 19 produces coherent target DoA estimation results that are highly erroneous and broken.

As disclosed herein, one way to overcome the problems posed by constructing covariance matrices from sparse arrays is by interpolating the measurements of the missing elements to make a filled array. Conventional interpolation techniques involves linear approximation-based algorithms or auto-regressive model-based algorithms (e.g., Burg's algorithm). However, linear approximation-based algorithms suffer from model mismatch difficulties since the problem being solved is a non-linear problem so that any linear approximation-based algorithms are only applicable locally. In addition, auto-regressive model-based algorithms are essentially an extrapolation technique which requires many consecutive samples (from antenna section without missing elements) to extrapolate few missing elements. Both of these interpolation techniques have severe disadvantages in terms of accuracy limitations and computational processing requirements.

Figure 4:
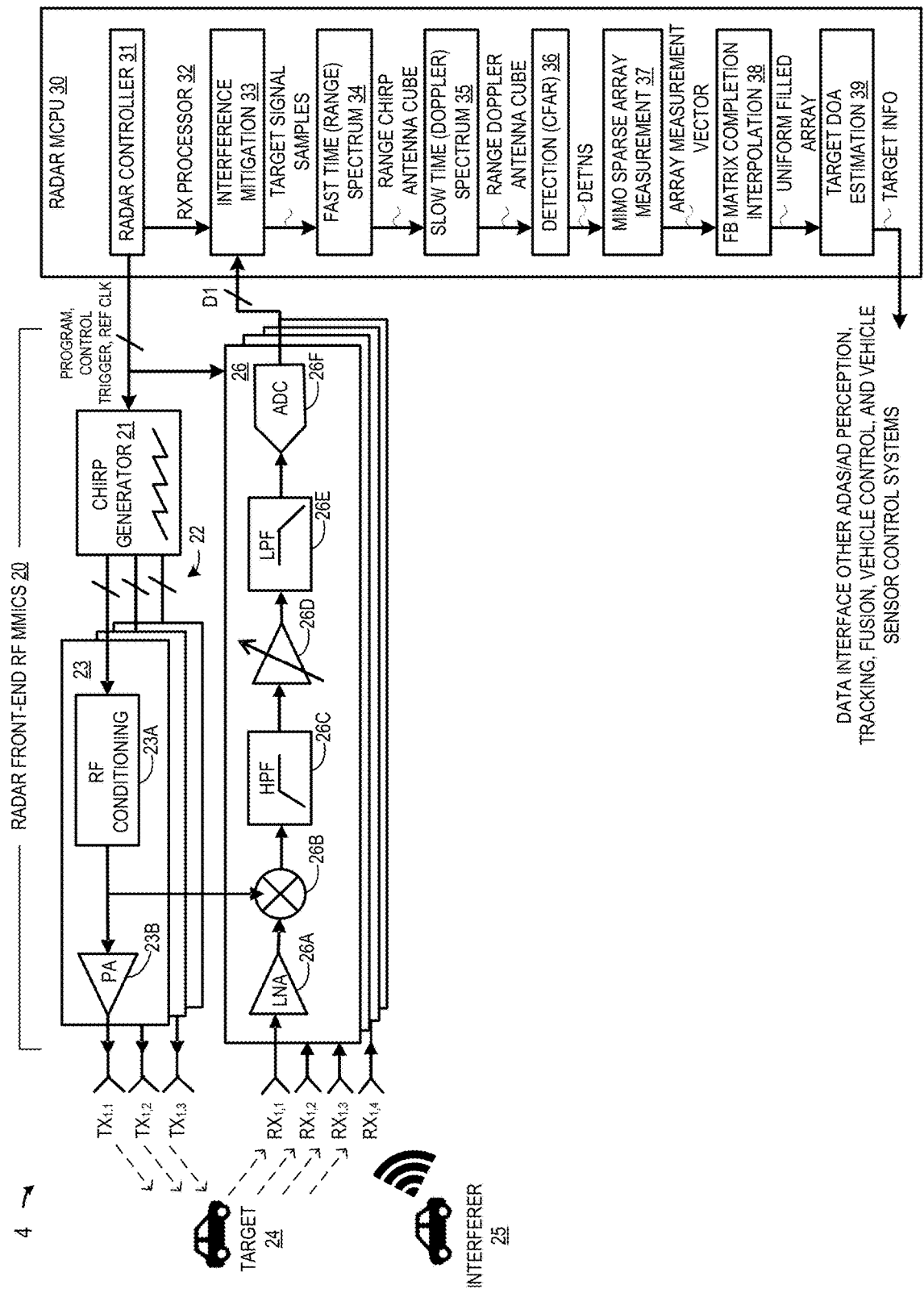
FIG. 4 is a simplified schematic block diagram of a linear frequency modulation automotive radar system which processes a MIMO sparse array with forward backward Hankel matrix completion processing to compute a super-resolution target DoA estimation in accordance with selected embodiments of the present disclosure.

To address these limitations from conventional solutions and others known to those skilled in the art, reference is now made to FIG. 4 which depicts a simplified schematic diagram of a linear frequency modulation (LFM) automotive radar system 4 which processes a MIMO sparse array with forward and backward Hankel matrix completion (FB-Hankel-MC) based algorithm, including its variants, that is applied as a key pre-processing step to the super-resolution target DoA estimation processing step in the radar chain of an automotive radar system. As described more fully hereinbelow, selected embodiments of the forward backward Hankel matrix completion algorithm may use measurement-preserving rank minimization processing or nuclear-norm minimization processing to complete a left-right or top-bottom concatenated forward backward Hankel or Toeplitz matrix before performing super-resolution angular-domain spectral analysis that produces super-resolution DoA estimates.

As depicted, the LFM automotive radar system 4 may be implemented as a distributed coherent radar system that includes one or more distributed radar front-end RF MMIC devices 20 connected to a radar microcontroller processor unit (MCPU) 30. In selected embodiments, each radar front-end RF MMIC device 20 may be embodied as a line-replaceable unit (LRU) or modular component that is designed to be replaced quickly at an operating location. Similarly, the radar MCPU 30 may be embodied as a line-replaceable unit (LRU) or modular component. As will be appreciated, any desired number of radar front-end RF MMIC devices 20 may be used. In addition, the depicted radar system 4 may be implemented in integrated circuit form with the distributed radar front-end RF MMIC devices 20 and the radar MCPU 30 formed with separate integrated circuits (chips) or with a single chip, depending on the application.

Each distributed radar front-end RF MMIC device 20 includes one or more transmitting antenna elements $TX_i$ and receiving antenna elements $RX_j$ connected, respectively, to one or more radio-frequency (RF) transmitter (TX) units 23 and receiver (RX) units 26. For example, each radar device (e.g., 20) is shown as including individual antenna elements (e.g., $TX_{1,i}$, $RX_{1,j}$) connected, respectively, to three transmitter modules (e.g., 23) and four receiver modules (e.g., 26), but these numbers are not limiting and other numbers are also possible, such as four transmitter modules 23 and six receiver modules 26, or a single transmitter module 23 and/or a single receiver modules 26. Each radar device 20 also includes a chirp generator 21 which is configured and connected to supply a chirp input signal 22 to the transmitter module(s) 23. To this end, the chirp generator 21 is connected to receive a program, controller trigger, and reference local oscillator (LO) signal from the radar MCPU 30. In selected embodiments, multiple transmitter elements 23 may operate in a non-coherent fashion because, even though they are programmed to transmit identical waveforms and share a common schedule, the generated waveforms are likely to have distinct starting frequencies, phases, and transmitting time due to different timing and phases for the reference LO signal and signal path differences for the chirp start trigger signal.

The radar system 4 also includes a radar controller processing unit 30 that is connected to supply input control signals to the distributed radar front-end RF MMIC device 20 and to receive therefrom digital output signals D1 generated by the receiver modules 26. In selected embodiments, the radar controller processing unit 30 may be embodied as a microcontroller unit or other processing unit that is configured and arranged for signal processing tasks such as, but not limited to, target identification, computation of target distance, target velocity, and target direction, and generating control signals. The radar controller processing unit 30 may, for example, be configured to generate calibration signals, receive data signals, receive sensor signals, generate frequency spectrum shaping signals (such as ramp generation in the case of FMCW radar) and/or state machine signals for RF (radio frequency) circuit enablement sequences. In addition, the radar controller processor 30 may be configured to program the transmitter and receiver module 23, 26 to operate in a coordinated fashion by transmitting MIMO waveforms for use in constructing a virtual aperture from a combination of the distributed apertures formed by the distributed transmitting and receiving antenna elements $TX_i$, $RX_j$.

In the example shown, the chirp generator 21 generates chirp signals 22 in response to a chirp start trigger signal and a corresponding reference local oscillator signal (Reference LO). The resulting chirp signal 22 from each chirp generator 21 is then processed by the RF conditioning unit 23A and amplified at the power amplifier (PA) 23B which amplifies the signal to a level suitable for transmission as a radar signal by a transmitter antenna unit $TX_{1,i}$. Though not shown, it will be understood that the transmitter module 23 may include additional processing circuits, such as a digital-to-analog converter (DAC), phase shifter (or phase rotator), buffer, mixer, filter, and the like.

The radar signal transmitted by the transmitter antenna unit $TX_{1,i}$ may be reflected by a target object, such as a vehicle 24. Part of the reflected radar signal (e.g., monostatic target returns) reaches receiver antenna units $RX_{1,1}$ at the first distributed radar front-end RF MMIC device 20, and another part (e.g., bi-static target returns) reaches receiver antenna units $RX_{1,2}$ at a second distributed radar front-end RF MMIC device 20. At each receiver module 26, the received (radio frequency) antenna signal is amplified by a low noise amplifier (LNA) 26A and then fed to a mixer 26B where it is mixed with the RF conditioned signal generated by the RF conditioning unit 23. The resulting intermediate frequency signal is fed to a first high-pass filter (HPF) 26C. The resulting filtered signal is fed to a first variable gain amplifier 26D which amplifies the signal before feeding it to a first low pass filter (LPF) 26E. This re-filtered signal is fed to an analog/digital converter (ADC) 26F and is output by each receiver module 26 as a digital signal D1. At the radar controller 30, the digital signal D1 is processed by the radar modules 33-39 as described hereinbelow.

In order for each receiver module 26 to be able to distinguish transmitted radar signals from reflected target return radar signals, the transmitted radar signals may be coded so they can be separated at the receiver modules 26. Such separability can be achieved with code-division multiple access (CDMA), frequency-division multiple access (FDMA), or time-division multiple access (TDMA) techniques. For example, the transmitter antenna units $TX_{1,i}$ on each distributed radar device (e.g., 20) may be controlled and configured to transmit one at a time to form a Time-Division MIMO aperture. In another example, each transmitter antenna unit $TX_{1,i}$ may be controlled and configured to transmit with an amount of frequency shift for forming Doppler-Division (DD) or Frequency-Division (FD) MIMO apertures. In yet another example, each transmitter antenna units $TX_{1,i}$ may be controlled and configured to transmit all at once, but with chirps coded with pseudo-random sequences that are orthogonal across transmitters for forming Code-Division (CD) MIMO apertures.

Under control of the radar controller processor 30, the LFM automotive radar system 4 may be configured to operationally combine multiple, physically separated small-aperture radars 20 to function as a single large coherent aperture radar. To this end, the radar MCPU 30 may include a radar controller processor 31 which is configured to command the distributed radar MMICs 20 to transmit MIMO waveforms according to an orthogonal schedule or coding scheme. The transmitted waveform signal radiates out from the transmitter antenna units $TX_{1,i}$ and is reflected by the target 24 in the field of view of the antennas so that the echo or returns are received by the receiver antenna units $RX_{1,j}$. As depicted, the receiver antenna units $RX_{1,j}$ may also receive interference from other interferers 25, such as transmit radar signals generated by a target vehicle. At the receiver module(s) 26, the received radar transmit return signals are amplified, mixed, filtered, and digitized to generate the digital output signal D1 that is passed to the receiver RX processor 32 for processing by the radar modules 33-39. In particular, the digital output signal D1 may be processed by the interference mitigation module 33 to generate target signal samples that are provided to one or more FFT modules 34-35, such as a fast-time (range) spectrum FFT module 34 and slow-time (Doppler) spectrum FFT module 35, thereby generating, respectively the rang chirp antenna cube and range-Doppler antenna cube as a range Doppler map (RDM) output. In turn, the RDM outputs are passed through a CFAR detection module 36 to obtain the range-Doppler peak detections which are then further processed by the MIMO sparse array measurement construction module 37 which generates an array measurement vector corresponding to a MIMO virtual sparse array.

As will be appreciated, the spacing and arrangement of the transmitting and receiving antenna elements $TX_{1,i}$, $RX_{1,j}$ may result in the construction of a sparse virtual MIMO array (e.g., contains holes or gaps), resulting in high grating lobes in the formed radar beam pattern. To address the potential grating or spurious lobe issues of sparse arrays, the radar controller processor 30 may be configured with a forward and backward matrix completion array interpolation module 38 which is operative to perform forward and backward matrix completion processing to resolve the missing element interpolation problem with any forward and backward Hankel or Toeplitz matrices as a mitigation technique for suppressing the spurious sidelobes. In operation, the radar controller processor 30 uses the forward and backward matrix completion array interpolation module 38 to construct forward and backward Hankel or Toeplitz matrices based on array measurement vector output by the MIMO sparse array measurement construction module 37. The forward and backward Hankel/Toeplitz matrix completion processing performed by the FB matrix completion array interpolation module 38 generates measurements of the missing elements of the sparse array, thereby constructing a filled uniform array. At the target DoA estimation module 39, a super-resolution DoA estimation algorithm, such as Matrix Pencil, may be applied to the filled uniform array to estimate the angular information of targets using the completed uniform array measurements. Based on this processing, the radar controller processor 30 may then generate and output the target information as a Range-Doppler-Angle map data over a data interface (I/F) to other automotive systems, such as ADAS/AD perception, tracking fusion, vehicle control, and/or vehicle sensor control systems.

Figure 5:
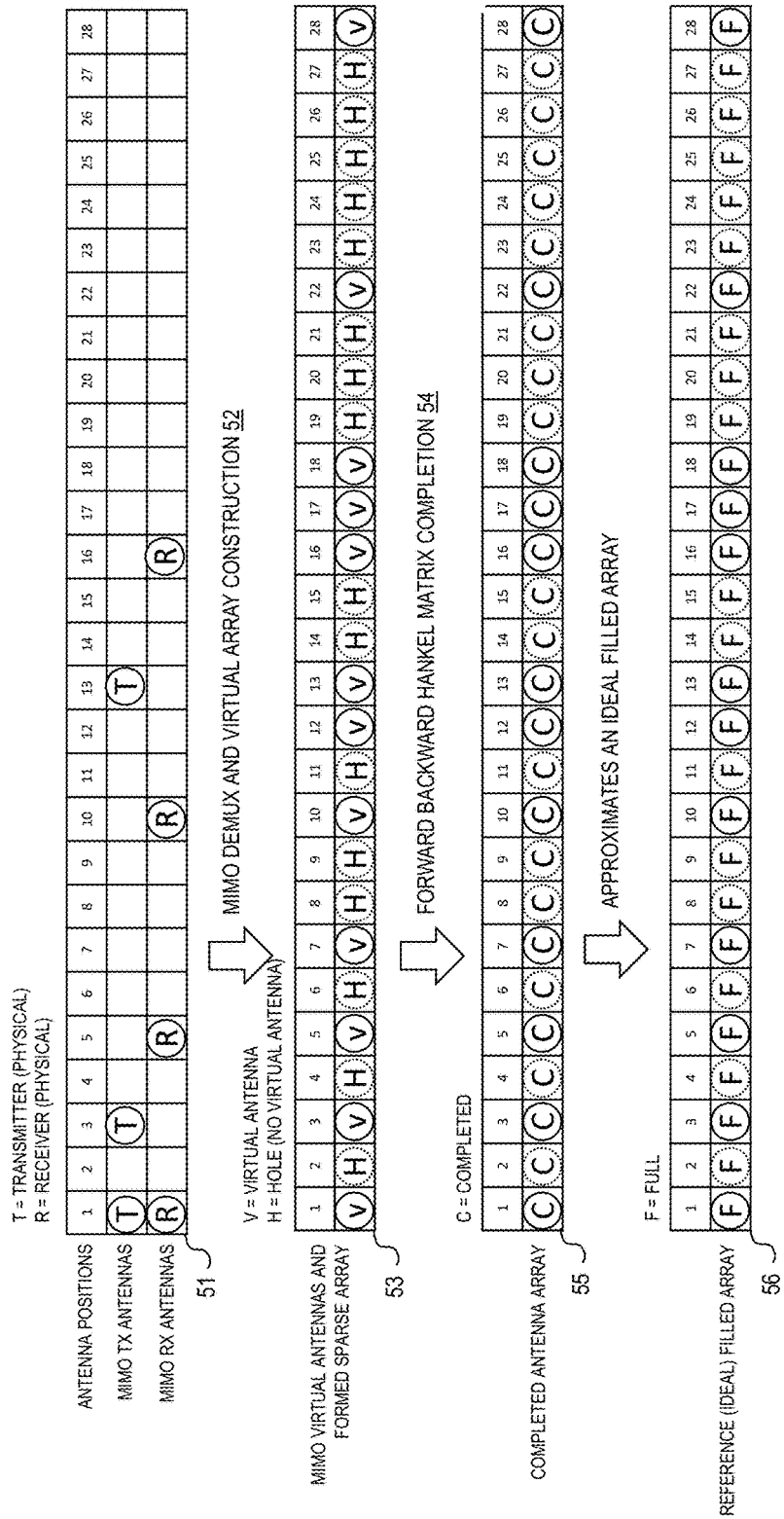
FIG. 5 is a simplified diagrammatic depiction illustrating application of forward backward Hankel matrix completion processing to solve a sparse array interpolation problem in accordance with selected embodiments of the present disclosure.

As disclosed herein, the forward and backward matrix completion array interpolation module 38 may use a predetermined sequence of pre-processing steps to perform forward and backward Hankel or Toeplitz matrix completion processing to mitigate the spurious sidelobes due to spatial under-sampling and non-uniform sampling. An example processing sequence is described hereinbelow with reference to FIG. 5 which is a simplified diagrammatic depiction 5 of the application of forward backward Hankel matrix completion processing to provide sparse array interpolation in accordance with selected embodiments of the present disclosure. In particular, a first physical array 51 of three transmit TX antennas and four receive RX antennas is depicted wherein the antenna elements are non-uniformly distributed, respectively, at transmit antenna positions 1, 3 and 13 and receive antenna positions 1, 5, 10, and 16. Using any suitable MIMO demultiplexing and virtual array construction process 52, the 3T4R MIMO radar system may be used to construct a sparse array 53 of equal aperture with twelve virtual antenna elements, where the presence of each virtual antenna element is indicated with a "V" and where the missing antenna element holes are indicated with an "H." Since there are holes in the constructed array 53 at antenna positions 2, 4, 6, 8-9, 11, 14-15, 19-21, and 23-27, it is "sparse" array. By applying forward backward Hankel matrix completion processing 54 which uses an iterative rank minimization process to complete the forward backward Hankel matrix, the sparse array 53 of MIMO virtual antennas may be used to construct a completed antenna array 55 of equal aperture with 28 antenna elements, where the presence of each completed antenna element is indicated with a "C." As shown in FIG. 5, the completed antenna array 55 is a uniform filled array with completed values that approximates a reference or ideal filled array 56, and is therefore suitable for subsequent beamforming process wherein the sidelobes are suppressed to enable super-resolution DoA estimation.

Figure 6:
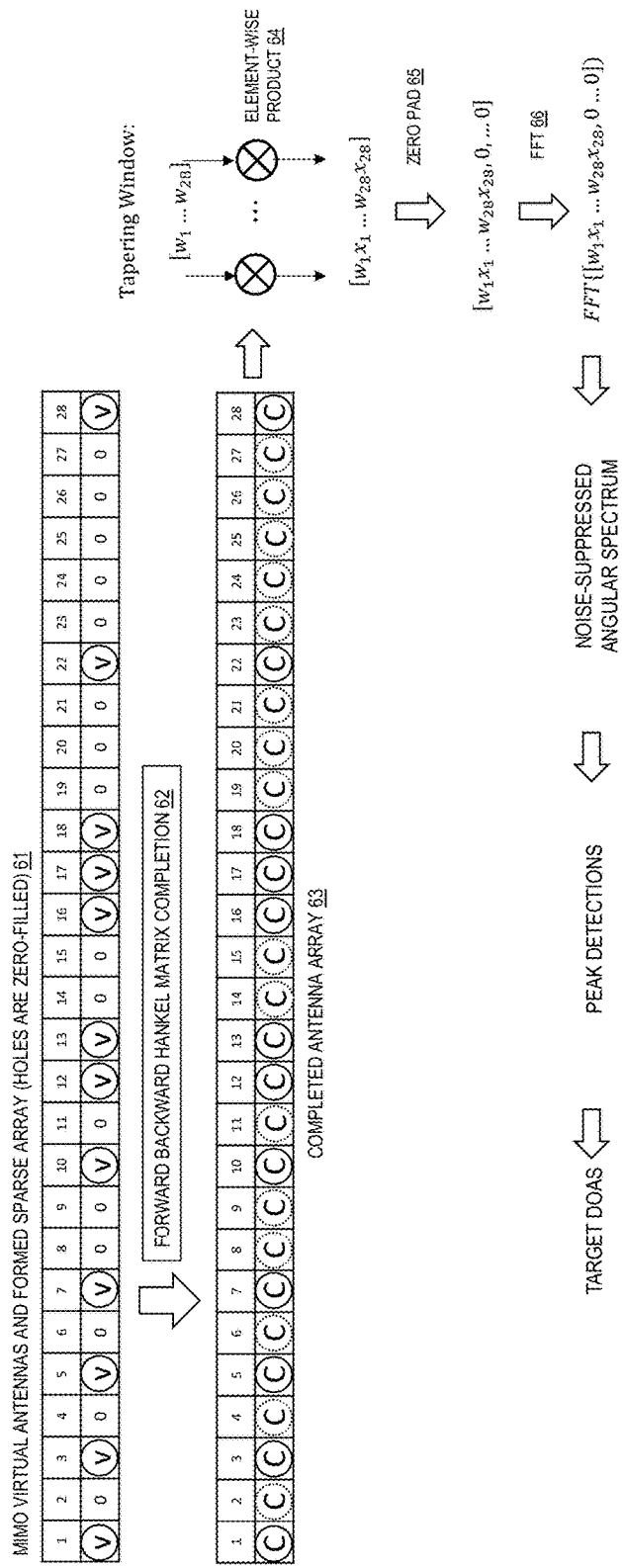
FIG. 6 is a simplified diagrammatic depiction illustrating application of forward backward Hankel matrix completion processing to a sparse array to form a completed array that is used with super-resolution coherent target DoA estimation in accordance with selected embodiments of the present disclosure.

To provide additional details for an improved understanding of selected embodiments of the present disclosure, reference is now made to FIG. 6 which is a simplified diagrammatic depiction 6 to illustrate application of forward backward Hankel matrix completion processing to a sparse array 61 to form a completed array 63 that is used with super-resolution coherent target DoA estimation in accordance with selected embodiments of the present disclosure. As depicted, the sparse linear array 61 is constructed as a MIMO virtual antenna array with non-uniformly spaced virtual antenna elements V and with zero-filled holes at the indicated antenna positions. After applying forward backward Hankel matrix completion processing 62, a completed antenna array 63 is constructed with completed uniform array measurements. The depicted completed linear antenna array 63 is processed as a receive vector $[x_1, \ldots x_{28}]$ by using an element-wise multiplier 64 to apply a set of tapering window values $[w_1, \ldots w_{28}]$, thereby generating an output product $[w_1 x_1, \ldots w_{28} x_{28}]$. After applying zero padding 65 to generate a padded product vector $[w_1 x_1, \ldots w_{28} x_{28}, 0, \ldots 0]$, FFT transformation processing 66 is applied to generate the FFT-transformed vector ($FFT\{[w_1 x_1, \ldots w_{28} x_{28}, 0, \ldots 0]\}$). As will be appreciated, the FFT-transformed vector will generate a noise-suppressed angular spectrum wherein unwanted sidelobes do not interfere with the detection and processing of peaks for use in performing target DoA estimation.

Figure 7:
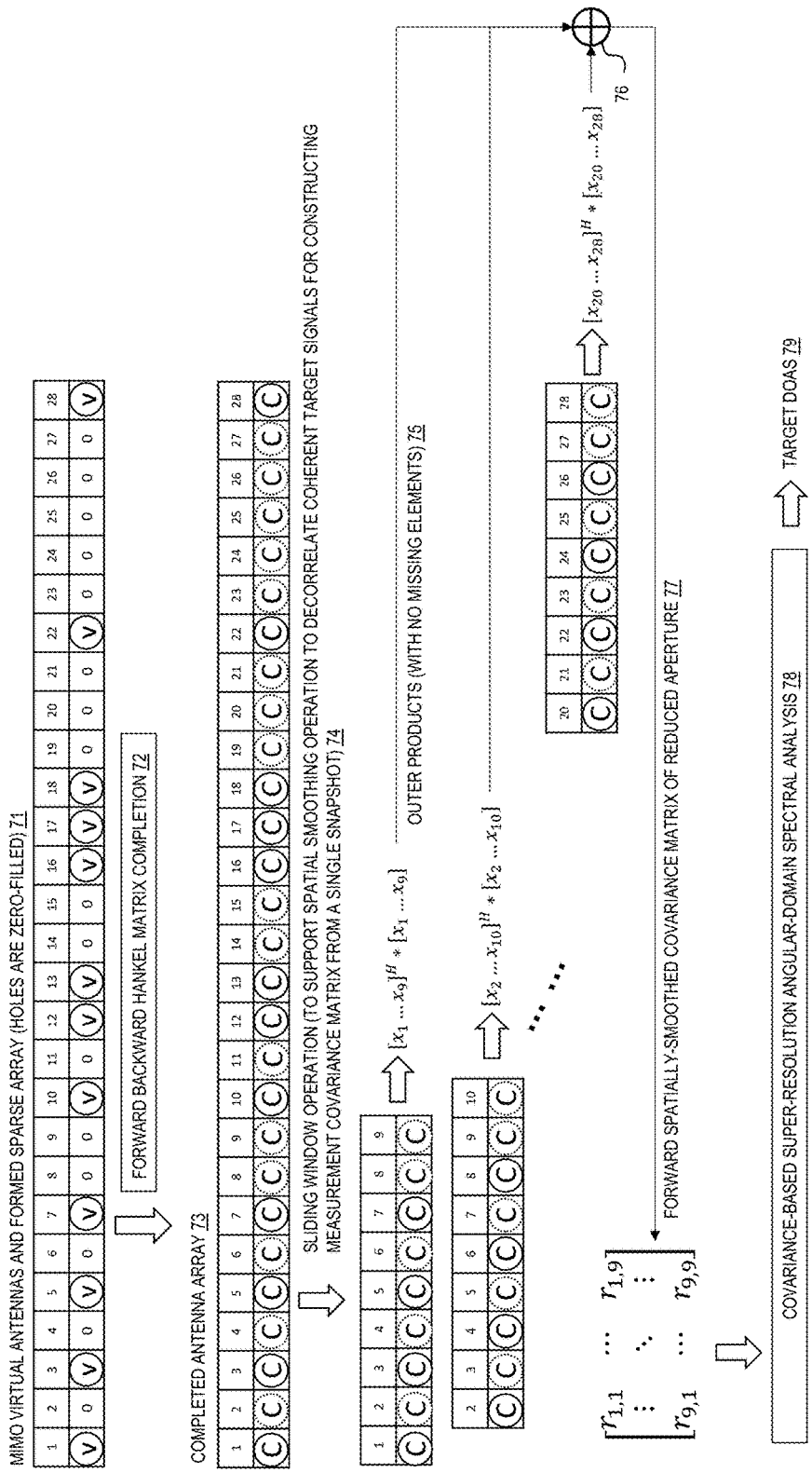
FIG. 7 is a simplified diagrammatic depiction illustrating application of forward backward Hankel matrix completion processing to a sparse array to form a completed array that is processed with a sliding window to form a forward-only spatial smoothing covariance matrix used with super-resolution coherent target DoA estimation in accordance with selected embodiments of the present disclosure.

To further illustrate selected embodiments of the present disclosure, reference is now made to FIG. 7 which is a simplified diagrammatic depiction 7 to illustrate application of forward backward Hankel matrix completion processing to a sparse array 71 to form a completed array 73 that is processed with a sliding window operation 74 to form a forward-only spatial smoothing covariance matrix 77 that may be used with super-resolution coherent target DoA estimation. As depicted, the sparse linear array 71 is constructed as a MIMO virtual antenna array with non-uniformly spaced virtual antenna elements V and with zero-filled holes at the indicated antenna positions. After applying forward backward Hankel matrix completion processing 72, a completed antenna array 73 is constructed with completed uniform array measurements. The depicted completed linear antenna array 73 is processed as a receive vector $[x_1, \ldots x_{28}]$ by applying a sliding window operation 74 to a subset of the receive vector elements (e.g., $[x_1 \ldots x_9]$) to compute the outer product vector 75 from the subset of the receive vector elements times the conjugate transpose of the subset of the receive vector elements (e.g., Outer Product=$[x_1 \ldots x_9]^{H*}$ $[x_1 \ldots x_9]$). The application of the sliding window operation 74 to compute outer products provides a spatial smoothing function to decorrelate coherent target signals for constructing a measurement covariance matrix from a single snapshot. Using an adder 76, the outer products 75 computed across the receive vector $[x_1, \ldots x_{28}]$ are summed to generate a forward spatially-smoothed covariance matrix 77 which has a reduced aperture. Subsequently, the forward spatially-smoothed covariance matrix 77 may be processed with a covariance-based super-resolution angular-domain spectral analysis algorithm 78, such as MUSIC or ESPRIT or Super Matrix Pencil, to identify target DoA values 79.

Figure 8:
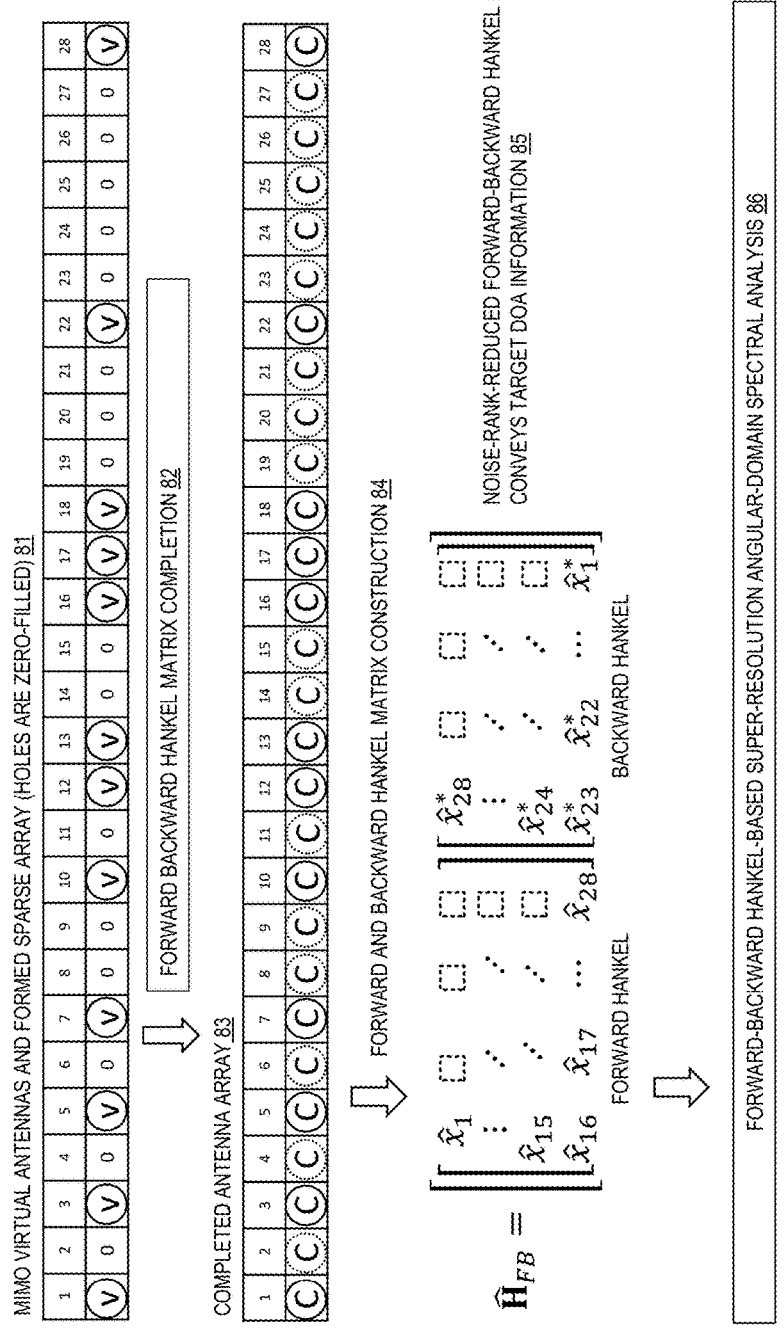
FIG. 8 is a simplified diagrammatic depiction illustrating indirect application of forward backward Hankel matrix completion processing to a sparse array to form a completed array that is processed to form a forward backward Hankel matrix used with super-resolution coherent target DoA estimation in accordance with selected embodiments of the present disclosure.

To provide additional details for an improved understanding of selected embodiments of the present disclosure, reference is now made to FIG. 8 which is a simplified diagrammatic depiction 8 to illustrate indirect application of forward backward Hankel matrix completion processing to a sparse array 81 to form a completed array 83 that is processed to form a forward and backward Hankel matrix 85 that may be used with super-resolution coherent target DoA estimation 86. As depicted, the sparse linear array 81 is constructed as a MIMO virtual antenna array with non-uniformly spaced virtual antenna elements V and with zero-filled holes at the indicated antenna positions. After applying forward backward Hankel matrix completion processing 82, a completed antenna array 83 is constructed with completed uniform array measurements. In this indirect approach, the filled or completed antenna array 83 is then used to form a new filled forward and backward Hankel matrix $\hat{H}_{FB}$ 85 for subsequent processing. In particular, the depicted completed linear antenna array 83 is processed with a matrix construction step 84 to construct a noise-rank-reduced forward-backward Hankel matrix $\hat{H}_{FB}$ 85 with a left-right concatenated forward Hankel matrix and backward Hankel matrix which conveys target DoA information. Subsequently, the completed forward-backward Hankel matrix $\hat{H}_{FB}$ 85 may be processed with a forward-backward Hankel-based super-resolution angular-domain spectral analysis algorithm 86, such as MUSIC or ESPRIT or Super Matrix Pencil, to identify target DoA values 87.

To provide additional details for an improved understanding of selected embodiments of the present disclosure, reference is now made to FIG. 9 which is a simplified diagrammatic depiction 9 to illustrate the direct application of forward backward Hankel matrix completion processing 92 to a sparse array 91 to form a forward and backward Hankel matrix 93 that may be used with super-resolution coherent target DoA estimation 94. As depicted, the sparse linear array 91 is constructed as a MIMO virtual antenna array with non-uniformly spaced virtual antenna elements V and with zero-filled holes at the indicated antenna positions. After applying forward backward Hankel matrix completion processing 92, a forward and backward Hankel matrix $\hat{H}_{FB}$ 93 is formed without requiring the redundant step of forming a completed antenna array. In this direct approach, the forward and backward Hankel matrix $\hat{H}_{FB}$ 93 is formed directly from the sparse array 91 by performing forward backward Hankel matrix completion processing 92 on the sparse array 91. In particular, the forward backward Hankel matrix completion processing 92 directly constructs a noise-rank-reduced forward-backward Hankel matrix $\hat{H}_{FB}$ 93 with a left-right concatenated forward Hankel matrix and backward Hankel matrix which conveys target DoA information. Subsequently, the forward-backward Hankel matrix $\hat{H}_{FB}$ 93 may be processed with a forward-backward Hankel-based super-resolution angular-domain spectral analysis algorithm 94, such as Super Matrix Pencil, to identify target DoA values 95.

Figure 10A:
FIG. 10A is a simplified diagrammatic depiction of a left-right concatenated forward backward Hankel matrix which is processed for matrix completion using measurement-preserving rank minimization processing to form a completed forward backward Hankel matrix in accordance with selected embodiments of the present disclosure.

In accordance with selected embodiments of the present disclosure, a first variant of the disclosed forward backward matrix completion process is described with reference to FIG. 10A which depicts is a simplified diagrammatic depiction 10A of a left-right concatenated forward backward Hankel matrix $H_{FB}$ 103 which is processed for matrix completion to form a completed forward backward Hankel matrix $\hat{H}_{FB}$ 105.

As a first step, an array measurement vector 101 is constructed having the size of a filled array with the same aperture of the sparse array. In the array measurement vector 101, the elements of the sparse array are populated with the sparse array measurements V and the measurements of the missing elements are populated with zeros. As depicted in FIG. 10A, the array measurement vector $[x_1, \ldots x_{28}]$ has a $1^{st}$ element=$x_1$, a $2^{nd}$ element=$x_2$, an $M_1^{th}$ element=$x_{16}$, and an $(M_1+M_2-1)^{th}$ element=$x_{28}$.

As a second step, an $M_1 \times M_2$ forward Hankel matrix 103A is constructed out of the array measurement vector 101, where $(M_1+M_2-1)$ is the size of the array measurement vector 101. As constructed, the first column of the forward Hankel matrix 103A is populated by the $1^{st}$ to the $M_1^{th}$ elements of the array measurement vector. In addition, the last row of the forward Hankel matrix 103A is populated by the $M_1^{th}$ to the $(M_1+M_2-1)^{th}$ elements of the array measurement vector. Finally, the rest of the elements of the forward Hankel matrix 103A are populated anti-diagonally in which each anti-diagonal contains elements of identical values to the values in the first column or last row. To the extent any elements in the forward Hankel matrix 103A (e.g., $x_2$, $x_{14}$, $x_{15}$) correspond to missing elements in the array measurement vector, they are identified in the forward Hankel matrix 103A as being crossed out, and they may be populated in the forward Hankel matrix 103C with predetermined values (e.g., zeros).

As a third step, a backward array measurement vector is constructed as an index-reversed version of the array measurement vector 101 and then complex conjugated. Based on the array measurement vector $[x_1, \ldots x_{28}]$ depicted in FIG. 10A, the backward array measurement vector $[x^*_{28}, x^*_{27}, \ldots, x^*_1]$ has a $1^{st}$ element=$x^*_{28}$, a $2^{nd}$ element=$x^*_{27}$, an $M_1^{th}$ element=$x^*_{25}$, and an $(M_1+M_2-1)^{th}$ element=$x^*_1$.

As a fourth step, an $M_1 \times M_2$ backward Hankel matrix 103B is constructed out of the backward array measurement vector. As constructed, the first column of the backward Hankel matrix 103B is populated by the $1^{st}$ to the $M_1^{th}$ elements of the backward array measurement vector. In addition, the last row of the backward Hankel matrix 103B is populated by the $M_1^{th}$ to the $(M_1+M_2-1)^{th}$ elements of the backward array measurement vector. Finally, the rest of the elements of the backward Hankel matrix 103B is populated anti-diagonally in which each anti-diagonal contains elements of identical values to the values in the first column or last row. To the extent any elements in the backward Hankel matrix 103B (e.g., $x^*_{27}$, $x^*_{23}$, $x^*_{24}$, $x^*_{25}$, $x^*_{26}$) correspond to missing elements in the backward array measurement vector, they are identified in the backward Hankel matrix 103B as being crossed out, and they may be populated in the backward Hankel matrix 103D with predetermined values (e.g., zeros).

As a fifth step, the forward and backward Hankel matrices 103C, 103D are concatenated in a left-right manner to form the Forward/Backward Hankel Matrix (FBHM) $H_{FB}$ 103, in which the anti-diagonals of zeros map to the missing antennas of the sparse array.

As a sixth step, the FBHM $H_{FB}$ 103 is iteratively completed with a matrix completion process 104 to form the completed forward-backward Hankel matrix $\hat{H}_{FB}$ 105. In selected embodiments, the matrix completion process 104 iteratively applies measurement-preserving rank-minimization or nuclear-norm minimization processes with the objective to maintain a target rank for the completed FBHM $\hat{H}_{FB}$ 105, where the target rank is the assumed number of detectable targets which are being evaluated for DoA estimation. However, it will be appreciated that any suitable matrix completion algorithm may be used to form the completed forward-backward Hankel matrix $\hat{H}_{FB}$ 105. As a result of the matrix completion process 104, the forward and backward array measurement vector values $[x_1, \ldots x_{28}]$, $[x^*_{28}, x^*_{27}, \ldots, x^*_1]$—including the predetermined values (e.g., zeros)—in the FBHM $H_{FB}$ 103C, 103D are replaced with completed values $[\hat{x}_1, \ldots \hat{x}_{28}]$, $[\hat{x}^*_{28}, \hat{x}^*_{27}, \ldots, \hat{x}^*_1]$ in the completed forward-backward Hankel matrix $\hat{H}_{FB}$ 105 to minimize the matrix rank to match with the number of targets.

As a seventh step, a first forward array measurement vector 106 is extracted from the first column and last row of the left half 105A of the completed FBHM $\hat{H}_{FB}$ 105. In addition, a second backward array measurement vector 108 is extracted from the first column and last row of the right half 105B of the completed FBHM $\hat{H}_{FB}$ 105 by applying an index-reversing and complex conjugation process 107 to the right half 105B of the completed FBHM $\hat{H}_{FB}$ 105 in order to obtain the second backward array measurement vector 108.

As an eighth step, a first set of target direction of arrival (DoA) values may be estimated using the first forward array measurement vector 106. In addition, a second set of target DoA values may be estimated using the second backward array measurement vector 108. In selected embodiments, the first forward array measurement vector 106 may be compared to the second backward array measurement vector 108, and the final DoA values may be reported if the comparison indicates the DoA values are consistent.

As an alternative to the eighth step, a first target angular spectrum may be computed using the first forward array measurement vector 106, and a second target angular spectrum may be computed using the second backward array measurement vector 108. By using the minimal magnitude spectrum samples from the first and second target angular spectrum values to form a final apodized target angular spectrum value, the ambiguity sidelobes will be suppressed, thereby enabling detection of peaks in the angle spectrum to find target DoAs.

As seen from the foregoing, the completed FBHM $\hat{H}_{FB}$ 105 can be used directly for super-resolution DoA estimation. Alternatively, the completed array measurements can be extracted from the completed FBHM $\hat{H}_{FB}$ 105 for other types of angular spectral analyses. For example, the forward and backward array measurement vectors 106, 108 can be averaged or processed independently for consistency check or for apodization.

In accordance with selected embodiments of the present disclosure, a second variant of the disclosed forward backward matrix completion process is described with reference to FIG. 10B which depicts is a simplified diagrammatic depiction 10A of a top-bottom concatenated forward backward Hankel matrix $H_{FB}$ 113 which is processed for matrix completion to form a completed forward backward Hankel matrix $\hat{H}_{FB}$ 115. As a starting point, a sparse array measurement vector 111 is constructed as a linear vector with MIMO virtual antennas and missing (or zero) antenna elements, where the linear vector has a size of $(M_1+M_2-1)$ elements. By applying a top-bottom concatenated forward-backward Hankel matrix construction process 112 to the sparse array measurement vector 111, a top $M_1 \times M_2$ forward Hankel matrix 113A and a bottom $M_1 \times M_2$ backward Hankel matrix 113B are constructed. In particular, the first column of the top $M_1 \times M_2$ forward Hankel matrix 113A may be populated by the $1^{st}$ to the $M_1^{th}$ elements of the array measurement vector 111, the last row of the top $M_1 \times M_2$ forward Hankel matrix 113A may be populated by the $M_1^{th}$ to the $(M_1+M_2-1)^{th}$ elements of the array measurement vector 111, and the rest of the elements of the top $M_1 \times M_2$ forward Hankel matrix 113A may be populated anti-diagonally with identical values to the values in the first column or last row. And after constructing a backward array measurement vector as an index-reversed version of the array measurement vector 111, the first column of the bottom $M_1 \times M_2$ backward Hankel matrix 113B may be populated by the $1^{st}$ to the $M_1^{th}$ elements of the backward array measurement vector, the last row of the bottom $M_1 \times M_2$ backward Hankel matrix 113B may be populated by the $M_1^{th}$ to the $(M_1+M_2-1)^{th}$ elements of the backward array measurement vector, and the rest of the elements of the bottom $M_1 \times M_2$ backward Hankel matrix 113B may be populated anti-diagonally with identical values to the values in the first column or last row. To the extent any elements in the forward or backward Hankel matrices 113A, 113B correspond to missing elements in the array measurement vector 111, they may be populated in the forward or backward Hankel matrices 113C, 113D with predetermined values (e.g., zeros).

Upon concatenating the top $M_1 \times M_2$ forward Hankel matrix 113C and bottom $M_1 \times M_2$ backward Hankel matrix 113D in a top-bottom manner to form the Forward/Backward Hankel Matrix (FBHM) $H_{FB}$ 113, a matrix completion process 114 is iteratively applied to the FBHM $H_{FB}$ 113 to form the completed forward-backward Hankel matrix $\hat{H}_{FB}$ 115. As a result of the matrix completion process 114, the forward and backward array measurement vector values $[x_1, \ldots x_{28}]$, $[x^*_{28}, x^*_{27}, \ldots, x^*_1]$—including the predetermined values (e.g., zeros)—in the FBHM $H_{FB}$ 113C, 113D are replaced with completed values $[\hat{x}_1, \ldots \hat{x}_{28}]$, $[\hat{x}^*_{28}, \hat{x}^*_{27}, \ldots, \hat{x}^*_1]$ in the completed forward-backward Hankel matrix $\hat{H}_{FB}$ 115. Subsequently, first forward array measurement vector 116 may be extracted from the first column and last row of the top half 115A of the completed FBHM $\hat{H}_{FB}$ 115. In addition, a second backward array measurement vector 118 may be extracted from the first column and last row of the bottom half 115B of the completed FBHM $\hat{H}_{FB}$ 115 by applying an index-reversing and complex conjugation process 117 to the bottom half 115B of the completed FBHM $\hat{H}_{FB}$ 115, thereby computing the second backward array measurement vector 118.

Finally, a target direction of arrival (DoA) values may be estimated using the first forward array measurement vector 116 and/or second backward array measurement vector 118.

Figure 10C:
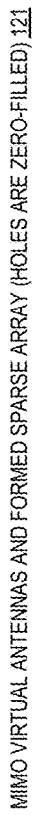
FIG. 10C is a simplified diagrammatic depiction of a left-right concatenated forward backward Toeplitz matrix which is processed for matrix completion using measurement-preserving rank minimization processing to form a completed forward backward Toeplitz matrix in accordance with selected embodiments of the present disclosure.

In accordance with selected embodiments of the present disclosure, a third variant of the disclosed forward backward matrix completion process is described with reference to FIG. 10C which depicts is a simplified diagrammatic depiction 10C of a left-right concatenated forward backward Toeplitz matrix $T_{FB}$ 123 which is processed for matrix completion to form a completed forward backward Toeplitz matrix $\hat{T}_{FB}$ 125. As disclosed, a sparse array measurement vector 121 is constructed as a linear vector with MIMO virtual antennas and missing (or zero) antenna elements, where the linear vector has a size of $(M_1+M_2-1)$ elements. By applying a left-right concatenated forward-backward Toeplitz matrix construction process 122 to the sparse array measurement vector 121, a left $M_1 \times M_2$ forward Toeplitz matrix 123A and a right $M_1 \times M_2$ backward Toeplitz matrix 123B are constructed. In particular, the first row of the left $M_1 \times M_2$ forward Toeplitz matrix 123A may be populated by the $1^{st}$ to the $M_1^{th}$ elements of the array measurement vector 121, the last column of the left $M_1 \times M_2$ forward Toeplitz matrix 123A may be populated by the $M_1^{th}$ to the $(M_1+M_2-1)^{th}$ elements of the array measurement vector 121, and the rest of the elements of the left $M_1 \times M_2$ forward Toeplitz matrix 123A may be populated diagonally with identical values to the values in the first row and last column. And after constructing a backward array measurement vector as an index-reversed version of the array measurement vector 121, the first row of the right $M_1 \times M_2$ backward Toeplitz matrix 123B may be populated by the $1^{st}$ to the $M_1^{th}$ elements of the backward array measurement vector, the last column of the right $M_1 \times M_2$ backward Toeplitz matrix 123B may be populated by the $M_1^{th}$ to the $(M_1+M_2-1)^{th}$ elements of the backward array measurement vector, and the rest of the elements of the right $M_1 \times M_2$ backward Toeplitz matrix 123B may be populated diagonally with identical values to the values in the first row or last column. To the extent any elements in the forward or backward Toeplitz matrices 123A, 123B correspond to missing elements in the array measurement vector 121, they may be populated in the forward or backward Toeplitz matrices 123C, 123D with predetermined values (e.g., zeros).

Stated more generally, the process for constructing a concatenated left-right super Toeplitz matrix (LR super Toeplitz matrix) starts by using an array vector s (which corresponds to the sparse array measurement vector 121) to construct a forward Toeplitz matrix 123A. In addition, a backwards array vector $\breve{s}$ is used to construct a backwards Toeplitz matrix 123B. For the s vector of N elements, $$s = [s_1, s_2, \ldots, s_N]^T \text{ or } [s_1, s_2, \ldots, s_{L+1}, \ldots s_{L+M-1}]^T,$$

where $N = L + M - 1$, two sub-vectors $[s_L, s_{L-1}, \ldots, s_1]^T$ and $[s_L, s_{L+1}, \ldots s_{L+M-1}]^T$ that are overlapped on the first element $(s_L)$ may be formed for construction of a forward Toeplitz matrix. These sub-vectors, $[s_L, s_{L-1}, \ldots, s_1]^T$ and $[s_L, s_{L+1}, \ldots s_{L+M-1}]^T$, span the first column and the first row of the forward Toeplitz matrix, respectively. And from the backwards array vector $\breve{s}$, two index-reversed and complex conjugated sub-vectors $[\breve{s}_L, \breve{s}_{L-1}, \ldots, \breve{s}_1]^T$ and $[\breve{s}_L, \breve{s}_{L+1}, \ldots \breve{s}_{L+M-1}]^T$ are extracted and used to construct the backward Toeplitz matrix by spanning the first column and the first row of the backward Toeplitz matrix with the two sub-vectors respectively (e.g., and diagonal elements set to be equal valued).

After horizontally concatenating the $M_1 \times M_2$ forward Toeplitz matrix 123C and $M_1 \times M_2$ backward Toeplitz matrix 123D in a left-right manner to form the Forward/Backward Toeplitz Matrix (FBTM) $T_{FB}$ 123, a matrix completion process 124 is iteratively applied to the FBTM $T_{FB}$ 123 to form the completed forward-backward Toeplitz matrix $\hat{T}_{FB}$ 125. As a result of the matrix completion process 124, the forward and backward array measurement vector values $[x_1, \ldots x_{28}]$, $[x^*_{28}, x^*_{27}, \ldots, x^*_1]$—including the predetermined values (e.g., zeros)—in the FBTM $T_{FB}$ 123C, 123D are replaced with completed values $[\hat{x}_1, \ldots \hat{x}_{28}]$, $[\hat{x}^*_{28}, \hat{x}^*_{27}, \ldots, \hat{x}^*_1]$ in the completed forward-backward Toeplitz matrix $\hat{T}_{FB}$ 125. Subsequently, first forward array measurement vector 126 may be extracted from the first row and last column of the left half 125A of the completed FBTM $\hat{T}_{FB}$ 125. In addition, a second backward array measurement vector 128 may be extracted from the first row and last column of the right half 125B of the completed FBTM $\hat{T}_{FB}$ 125 by applying an index-reversing and complex conjugation process 127 to the right half 125B of the completed FBTM $\hat{T}_{FB}$ 125, thereby computing the second backward array measurement vector 128.

Figure 10D:
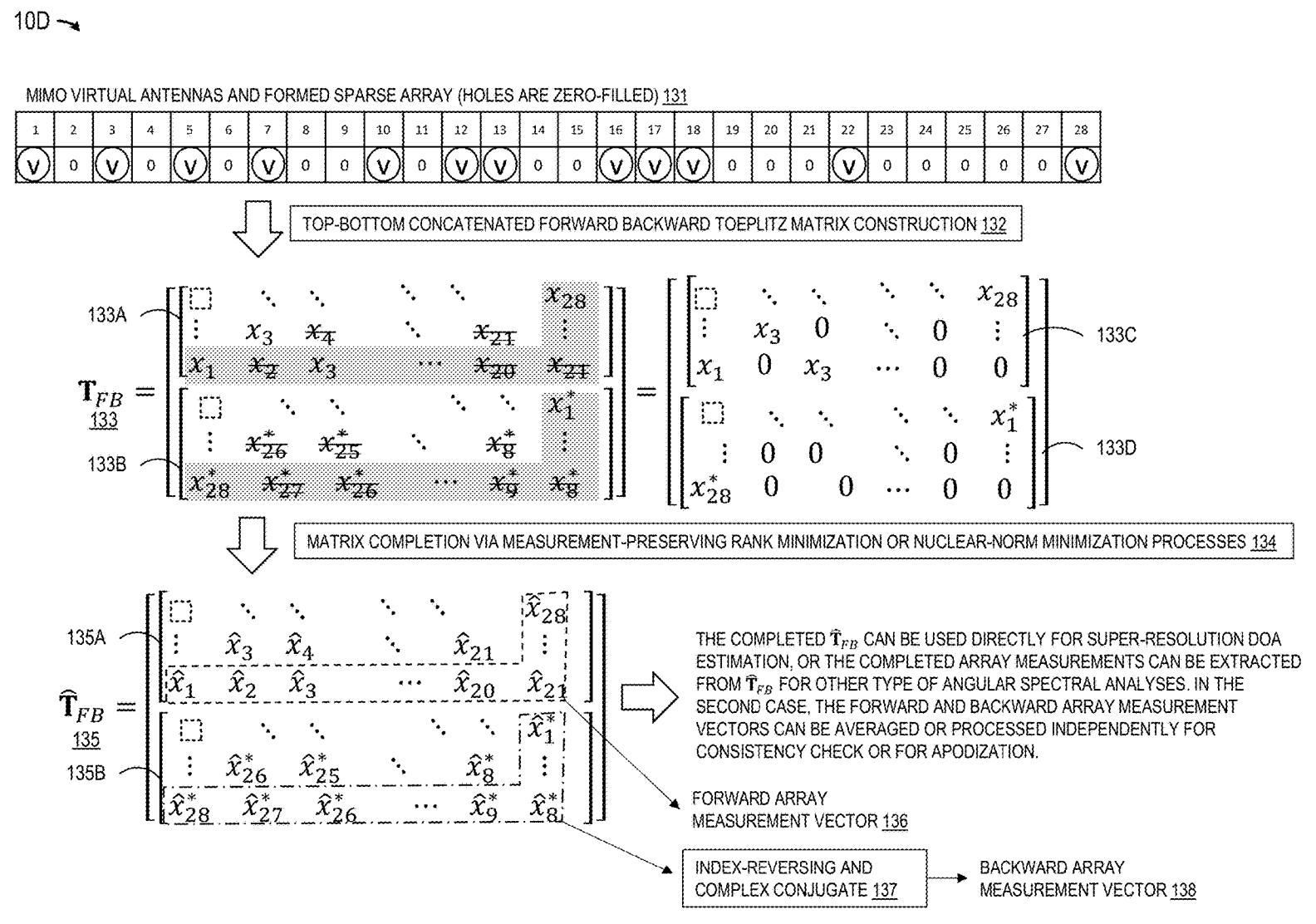

In accordance with selected embodiments of the present disclosure, a fourth variant of the disclosed forward backward matrix completion process is described with reference to FIG. 10D which depicts is a simplified diagrammatic depiction 10D of a top-bottom concatenated forward backward Toeplitz matrix $T_{FB}$ 133 which is processed for matrix completion to form a completed forward backward Toeplitz matrix $\hat{T}_{FB}$ 135. As disclosed, a sparse array measurement vector 131 is constructed as a linear vector with MIMO virtual antennas and missing (or zero) antenna elements, where the linear vector has a size of $(M_1+M_2-1)$ elements. By applying a top-bottom concatenated forward-backward Toeplitz matrix construction process 132 to the sparse array measurement vector 121, a left $M_1 \times M_2$ forward Toeplitz matrix 123A and a right $M_1 \times M_2$ backward Toeplitz matrix 123B are constructed. In particular, the first row of the left $M_1 \times M_2$ forward Toeplitz matrix 123A may be populated by the $1^{st}$ to the $M_1^{th}$ elements of the array measurement vector 121, the last column of the left $M_1 \times M_2$ forward Toeplitz matrix 123A may be populated by the $M_1^{th}$ to the $(M_1+M_2-1)^{th}$ elements of the array measurement vector 121, and the rest of the elements of the left $M_1 \times M_2$ forward Toeplitz matrix 123A may be populated diagonally with identical values to the values in the first row and last column. And after constructing a backward array measurement vector as an index-reversed version of the array measurement vector 121, the first row of the right $M_1 \times M_2$ backward Toeplitz matrix 123B may be populated by the $1^{st}$ to the $M_1^{th}$ elements of the backward array measurement vector, the last column of the right $M_1 \times M_2$ backward Toeplitz matrix 123B may be populated by the $M_1^{th}$ to the $(M_1+M_2-1)^{th}$ elements of the backward array measurement vector, and the rest of the elements of the right $M_1 \times M_2$ backward Toeplitz matrix 123B may be populated diagonally with identical values to the values in the first row or last column. To the extent any elements in the forward or backward Toeplitz matrices 123A, 123B correspond to missing elements in the array measurement vector 121, they may be populated in the forward or backward Toeplitz matrices 123C, 123D with predetermined values (e.g., zeros).

As disclosed herein, the forward/backward matrix completion processing involves numerical procedures that "complete" or fill the missing elements of the FBHM (or FBTM) which are filled with zeros, and there are a variety of suitable numerical procedures to complete a matrix that are inherently low rank, which means the rank of the FBHM/FBTM is smaller than the smallest dimension of the matrix. For purposes of the present disclosure, as long as the number of targets is smaller than the lower dimension of the FBHM/FBTM, it can be completed using any low-rank matrix recovery methods. A non-exclusive listing of low-rank matrix recovery or reconstruction methods includes, but is not limit to, nuclear-norm minimization, measurement preserving rank minimization, iterative hard thresholding (IHT), and iterative hard thresholding with projection (a.k.a., Projection) methods. In selected embodiments, the present disclosure is directed to the use of FBHM and FBTM with any matrix completion processes, and the specifics of the numerical procedures that perform the matrix completion computation need not be specified.

For an improved understanding of selected embodiments of the present disclosure, the following detailed description of forward backward Hankel matrix completion processing is provided. First, a uniform linear array is provided with M elements and unit (e.g. half-wavelength) element spacing. In addition, there are assumed to be K targets with distinct angles $\{\theta_k\}$, k=1, ..., K in the same range-Doppler bin. With the noiseless forward-only array response being given as $y=[y_1, \ldots, y_M]^T$, a Hankel matrix $\mathcal{H}$ (y) with dimensions of $M_1 \times L$ can be constructed, where $M_1=M-L+1$. Here, L is the pencil parameter. The Hankel matrix $\mathcal{H}$ (y) has a Vandermonde decomposition structure $\mathcal{H}$ (y)=$A\Sigma B^T$, where $$A=[a(\theta_1), \ldots, a(\theta_K)] \text{ and } B=[b(\theta_1), \ldots, b(\theta_K)],$$
with $$a(\theta_k) = \left[1, e^{-j2\pi \frac{d\sin(\theta_k)}{\lambda}}, \ldots, e^{-j2\pi \frac{d(M_1-1)\sin(\theta_k)}{\lambda}}\right]^T,$$

$$b(\theta_k) = \left[1, e^{-j2\pi \frac{d\sin(\theta_k)}{\lambda}}, \ldots, e^{-j2\pi \frac{d(L-1)\sin(\theta_k)}{\lambda}}\right]^T,$$

and $\Sigma=\text{diag}([\beta_1, \ldots, \beta_K])$. As a result, the rank of the Hankel matrix $\mathcal{H}$ (y) is K.

The noiseless conjugate backward array response can be written as $\bar{y}=[y^*_M, y^*_{M-1}, \ldots, y^*_1]^T$. Similarly, a Hankel matrix $\mathcal{H}$ ($\bar{y}$) with dimensions of $M_1 \times L$ can be constructed using the backward array response. With the forward and backward Hankel matrices $\mathcal{H}$ (y) and $\mathcal{H}$ ($\bar{y}$), a block Hankel matrix can be constructed as $Y_{FB}=[\mathcal{H}(y) \mathcal{H}(\bar{y})] \in \mathbb{C}^{M_1 \times 2L}$, whose rank is K if $M_1>K$ and $L>K/2$.

Upon considering a one-dimensional sparse array synthesized by MIMO radar technique, $M_t$ transmit and $M_r$ receive antenna elements can be sparsely deployed along a horizontal direction on a grid with a grid size as half wavelength. With the deployed $M_t$ transmit and $M_r$ receive antenna elements, a sparse linear array can be synthesized with $M_t M_r < M$ elements, where the sparse virtual array has the same aperture as the full array. Let $y_S \in \mathbb{C}^{M \times 1}$ denote the array response of the virtual sparse array, where the array response are filled with zeros at the $M-M_t M_r$ hole positions. Mathematically, $y_S = y \odot m$, where $\odot$ denotes the Hadamard multiplication and $m=[m_1, \ldots, m_M]^T$ is a mask vector with $m_j=1$ if the $j^{th}$ grid point is placed with a virtual array element or $m_j=0$ if the $j^{th}$ grid point is a hole. In practice, the array response is corrupted by additive white Gaussian noise with variance of $\sigma^2$, i.e., $z_S = y_S + n_S$.

Let $Z_{FB}^S=[\mathcal{H}(Z_S) \mathcal{H}(\bar{Z}_S)] \in \mathbb{C}^{M_1 \times 2L}$ denote the constructed block Hankel matrix, where $\bar{z}_S = \bar{y}_S + \bar{n}_S$ is the conjugate backward of the noisy sparse array response $z_S$. Here, $\bar{y}_S = \bar{y} \odot \bar{m}$ and $\bar{m}$ is a mask vector. To recover the holes in the sparse array, the low-rank forward-backward Hankel matrix (FBHM) is completed, such as by using a noisy matrix completion process that is formulated as a rank minimization problem, defined below:

$$\min_x \text{rank}([\mathcal{H}(x)\mathcal{H}(\bar{x})]) \text{ such that } \left\|[\mathcal{H}(x)\mathcal{H}(\bar{x})] \odot M_{FB} - Z_{FB}^S\right\|_F \leq \delta$$

Here, $M_{FB}=[\mathcal{H}(m)\mathcal{H}(\bar{m})] \in \mathbb{R}^{M_1 \times 2L}$ is a mask matrix and $\delta=\sqrt{m}+\sqrt{8m}\sigma$ describes the noise bound with m being the number of nonzero entries of $M_{FB}$.

As seen from above, the forward backward Hankel matrix recovery problem can then be solved efficiently with a matrix completion algorithm, like the iterative hard thresholding (IHT) method. In particular, an efficient iterative FB Hankel matrix completion algorithm is disclosed which does not explicitly compute the singular value decomposition (SVD) of the FB Hankel matrix by exploiting its properties and structures. And based on the completed full array, the direction of arrival (DOA) estimation is carried out using the matrix pencil method.

For an improved understanding of selected embodiments of the present disclosure, reference is now made to FIGS. 11-18 which depict example sparse array DoA estimation simulation results using the forward backward Hankel matrix completion processing techniques disclosed herein. In each of the simulation results, the true target angle and magnitude information are marked by an inverted triangle ($\nabla$). In addition, various beamforming angle spectrums are plotted to illustrate the comparative performance benefits of the forward backward Hankel matrix completion process disclosed herein. Finally, the target DoA estimated values computed directly from the matrix-completed sparse array by using a Super Matrix Pencil algorithm are plotted in the vertical black dashed lines.

Figure 11:
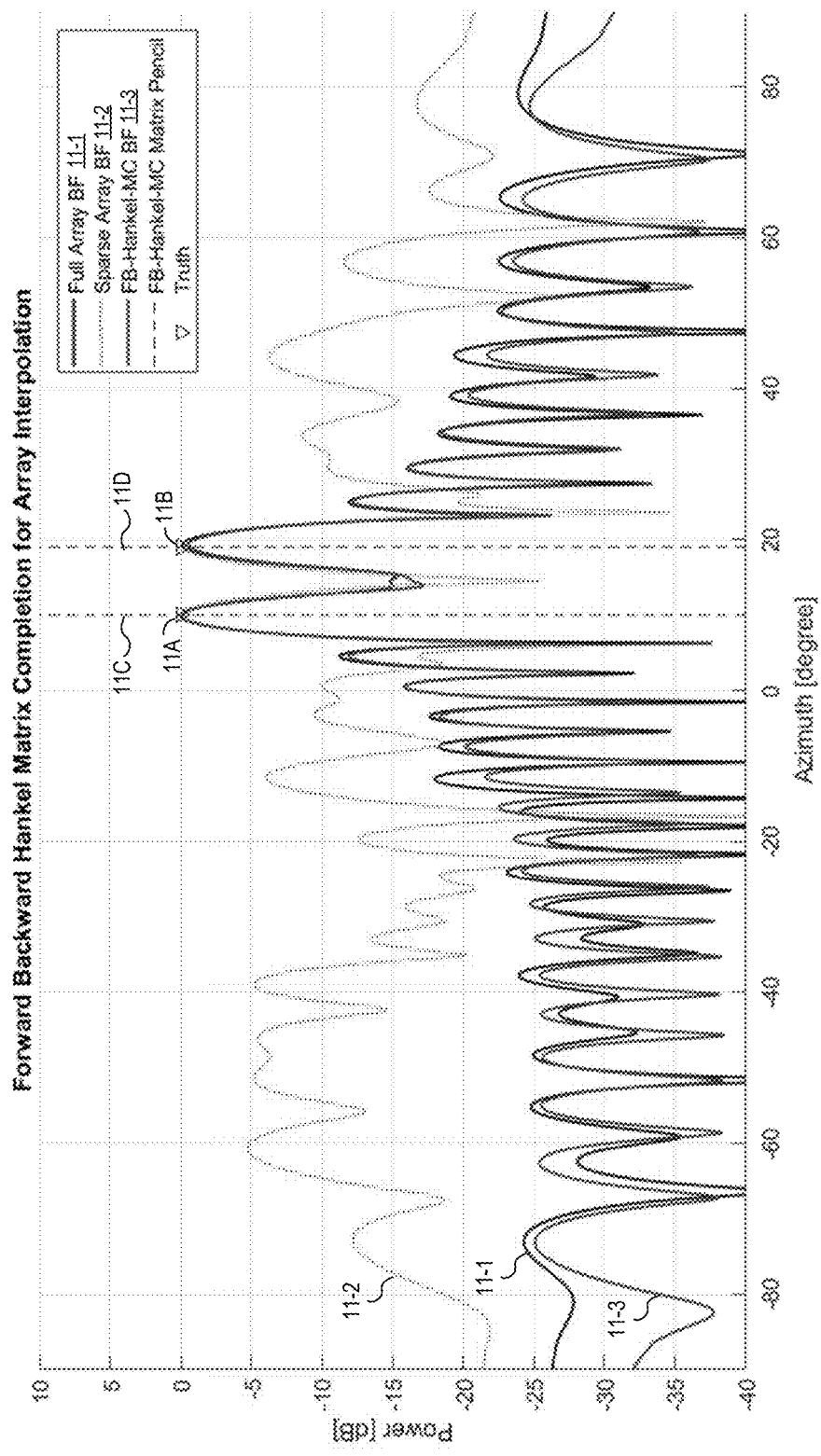
FIG. 11 depicts the comparative performance of a sparse array angle spectrum generated from a completed forward backward Hankel matrix to detect 2 targets that are separable by beamforming in accordance with selected embodiments of the present disclosure.

To illustrate the improved side lobe suppression benefits of the matrix array completion processing techniques disclosed herein, reference is now made to FIG. 11 which depicts a computer simulation 11 of the normalized spatial frequency or angle spectrum (hereinafter, angle spectrum) comparison of different beamformer output results for detecting two well-separated targets 11A, 11B. The first beamformer output result 11-1 depicts the beamforming angle spectrum generated by a forward backward Hankel matrix (FBHM) process that is applied to an ideal uniform linear filled array of antenna elements, where the target peaks 11A, 11B are aligned with the ideal filled array spectrum. The second beamformer output result 11-2 depicts the beamforming angle spectrum generated by a FBHM process that is applied to sparse linear array of antenna elements, where the beamformer output 11-2 includes ambiguity sidelobes (e.g., at azimuth angles −62°, −52°, −47°, −38°) which can cause erroneous target DoA estimation. The third beamformer output result 11-3 depicts the beamforming angle spectrum generated from a sparse linear array of antenna elements by performing low-rank recovery to complete the FBHM process that is applied to the sparse linear array, where the beamformer output sidelobes are suppressed due to the denoising effect of the low-rank recovery process. Finally, the vertical black dashed lines 11C, 11D show the target DoA estimated values computed directly from the matrix-completed sparse array 11-3 by using a Super Matrix Pencil algorithm. As the simulated beamformer output results show, the sparse array angle spectrum 11-3 generated from a completed forward backward Hankel matrix can be processed by a super-resolution DoA estimation algorithm to detect the targets 11A, 11B that are separable by beamforming.

Figure 12:
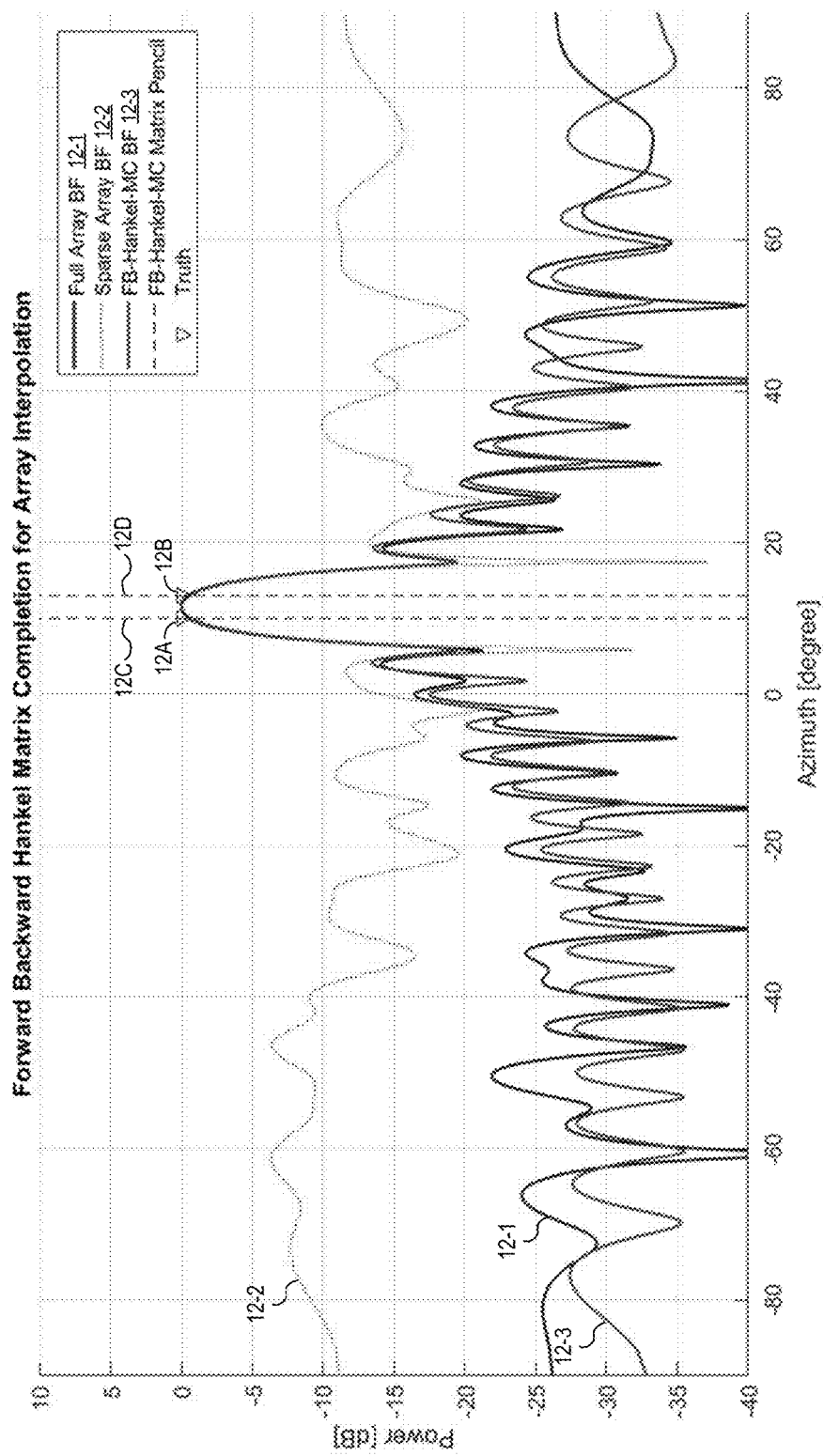
FIG. 12 depicts the comparative performance of a sparse array angle spectrum generated from a completed forward backward Hankel matrix to detect 2 targets that are not separable by beamforming in accordance with selected embodiments of the present disclosure.

To illustrate the improved target DoA detection benefits of the matrix array completion processing techniques disclosed herein, reference is now made to FIG. 12 which depicts a computer simulation 12 of the normalized angle spectrum comparison of different beamformer output results for detecting two targets 12A, 12B that are not separable by beamforming. The first beamformer output result 12-1 depicts the beamforming angle spectrum generated by a FBHM process that is applied to an ideal uniform linear filled array of antenna elements, where the target peaks 12A, 12B are contained within a single lobe of the ideal filled array spectrum. The second beamformer output result 12-2 depicts the FBHM-based beamforming angle spectrum generated from a sparse linear array of antenna elements, where the beamformer output 12-2 includes ambiguity sidelobes. The third beamformer output result 12-3 depicts the beamforming angle spectrum generated from a sparse linear array of antenna elements by performing low-rank recovery to complete the FBHM process that is applied to the sparse linear array. As shown, the recovered spectrum 12-3 aligns with the ideal filled array spectrum 12-1, but the peaks 12A, 12B are not distinguishable. Finally, the vertical black dashed lines 12C, 12D show the target DoA estimated values computed directly from the matrix-completed sparse array 12-3 by using a Super Matrix Pencil algorithm. As the simulated beamformer output results show, the sparse array angle spectrum 12-3 generated from a completed forward backward Hankel matrix can be processed by a super-resolution DoA estimation algorithm to detect the targets 12A, 12B that are not separable by beamforming.

Figure 13:
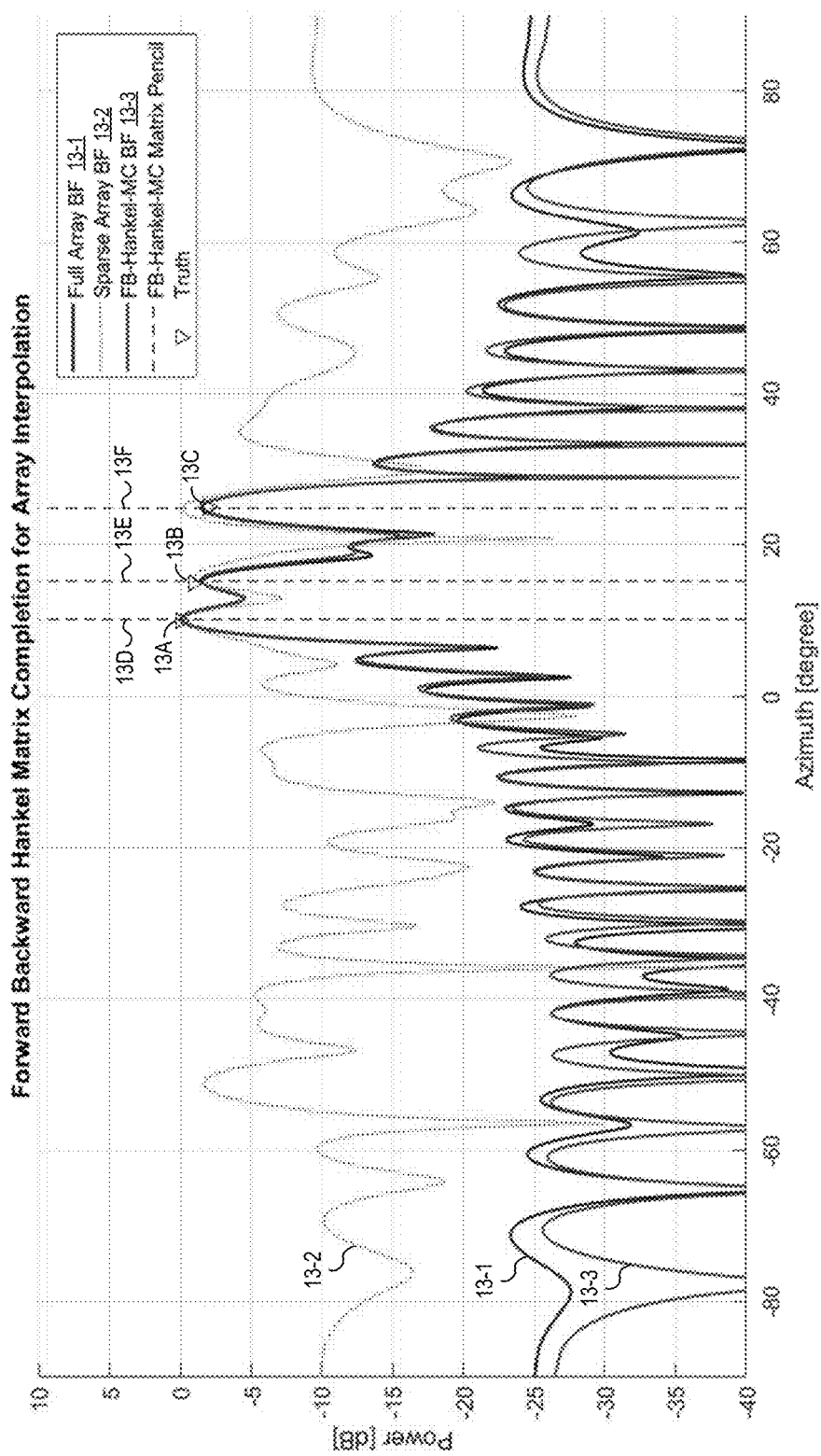
FIG. 13 depicts the comparative performance of a sparse array angle spectrum generated from a completed forward backward Hankel matrix to detect 3 targets that separable by beamforming in accordance with selected embodiments of the present disclosure.

To illustrate the improved side lobe suppression benefits of the matrix array completion processing techniques disclosed herein, reference is now made to FIG. 13 which depicts a computer simulation 13 of the normalized angle spectrum comparison of different beamformer output results for detecting three well-separated targets 13A, 13B, 13C. The first beamformer output result 13-1 depicts the beamforming angle spectrum generated by a FBHM process that is applied to an ideal uniform linear filled array of antenna elements, where the three target peaks 13A-C are well aligned with the ideal filled array spectrum. The second beamformer output result 13-2 depicts the FBHM-based beamforming angle spectrum generated from a sparse linear array of antenna elements, where the beamformer output 13-2 includes ambiguity sidelobes (e.g., at azimuth angles −52°, −43°, −39°, 32°) which can cause erroneous target DoA estimation. The third beamformer output result 13-3 depicts the beamforming angle spectrum generated from a sparse linear array of antenna elements by performing low-rank recovery to complete the FBHM process that is applied to the sparse linear array. As shown, the recovered spectrum 13-3 aligns with the ideal filled array spectrum 13-1, but the beamformer output sidelobes are suppressed due to the denoising effect of the low-rank recovery process. Finally, the vertical black dashed lines 13D, 13E, 13F show the target DoA estimated values computed directly from the matrix-completed sparse array 13-3 by using a Super Matrix Pencil algorithm. As the simulated beamformer output results show, the sparse array angle spectrum 13-3 generated from a completed forward backward Hankel matrix can be processed by a super-resolution DoA estimation algorithm to detect the three targets 13A, 13B, 13C that are separable by beamforming.

Figure 14:
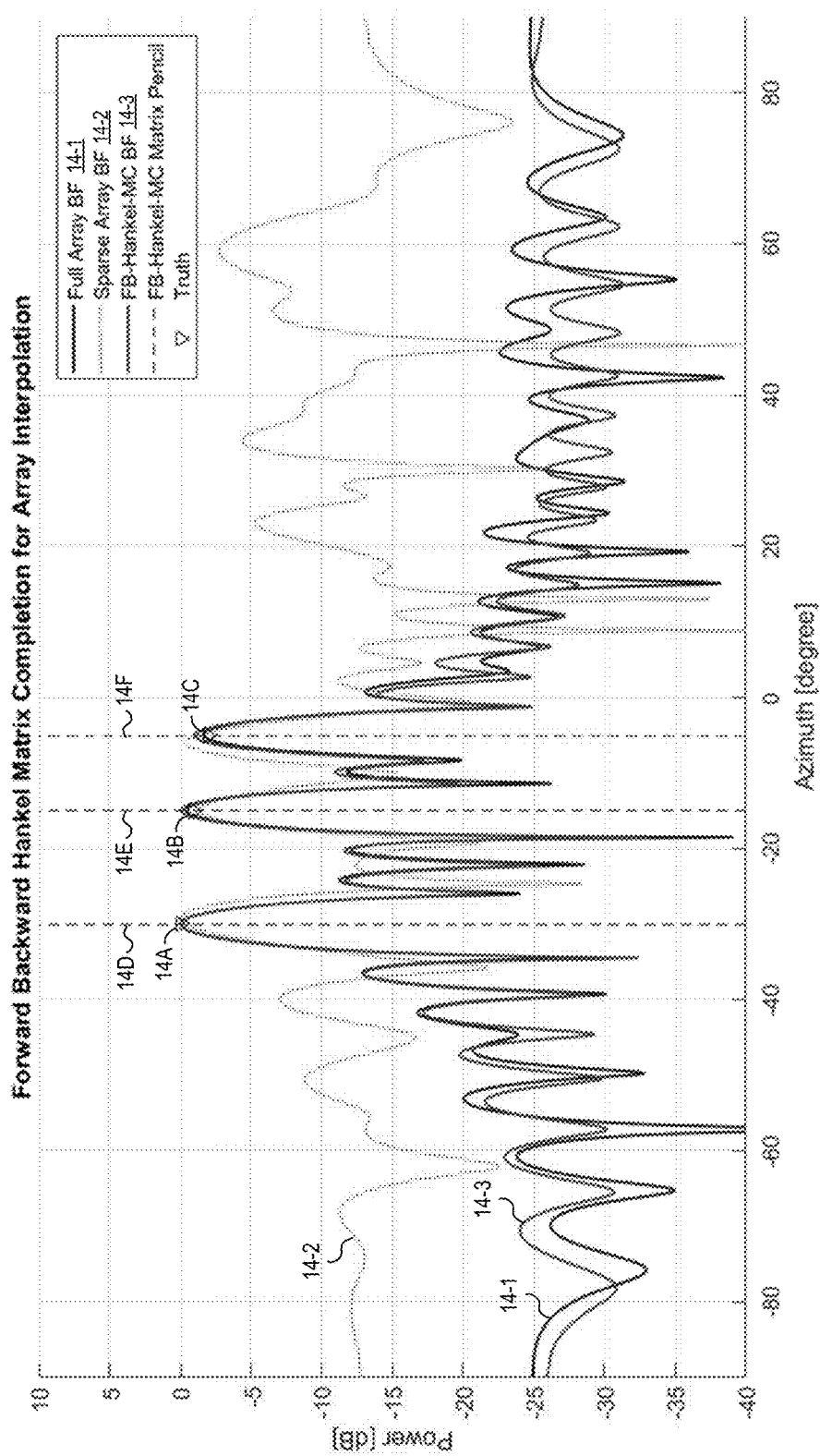
FIG. 14 depicts the comparative performance of a sparse array angle spectrum generated from a completed forward backward Hankel matrix to detect 3 targets that are separable by beamforming in accordance with selected embodiments of the present disclosure.

To provide another example of the improved side lobe suppression benefits of the matrix array completion processing techniques disclosed herein, reference is now made to FIG. 14 which depicts a computer simulation 14 of the normalized angle spectrum comparison of different beamformer output results for detecting three well-separated targets 14A, 14B, 14C. The first beamformer output result 14-1 depicts the beamforming angle spectrum generated by a FBHM process that is applied to an ideal uniform linear filled array of antenna elements, where the three target peaks 14A-C are well aligned with the ideal filled array spectrum. The second beamformer output result 14-2 depicts the FBHM-based beamforming angle spectrum generated from a sparse linear array of antenna elements, where the beamformer output 14-2 includes ambiguity sidelobes (e.g., at azimuth angles −50°, −40°, 22°, 32°, 58°) which can cause erroneous target DoA estimation. The third beamformer output result 14-3 depicts the beamforming angle spectrum generated from a sparse linear array of antenna elements by performing low-rank recovery to complete the FBHM process. Again, the recovered spectrum 14-3 aligns with the ideal filled array spectrum 14-1, but includes suppressed beamformer output sidelobes due to the denoising effect of the low-rank recovery process. Finally, the vertical black dashed lines 14D, 14E, 14F show the target DoA estimated values computed directly from the matrix-completed sparse array 14-3.

Figure 15:
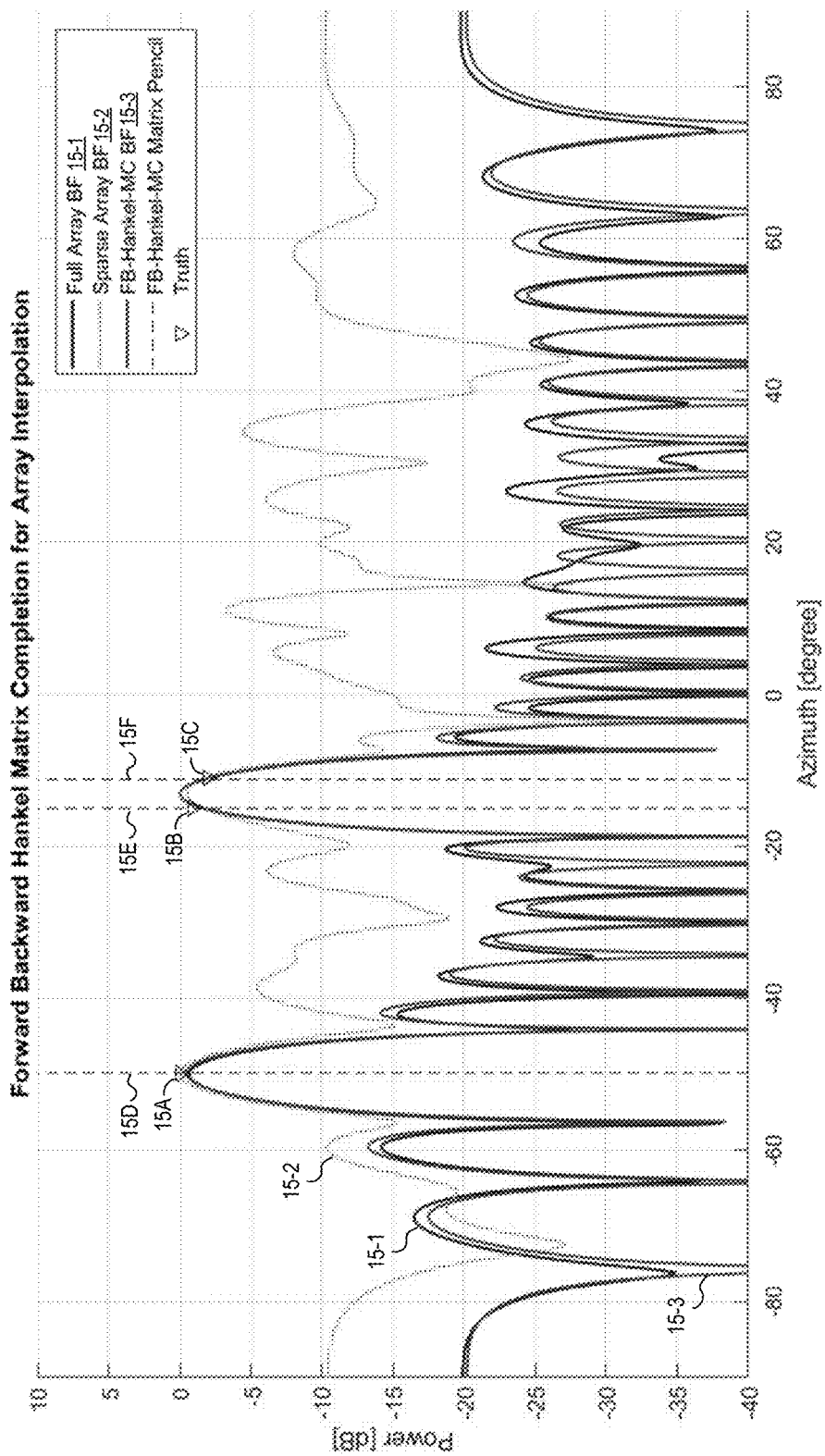
FIG. 15 depicts the comparative performance of a sparse array angle spectrum generated from a completed forward backward Hankel matrix to detect 3 targets that are not separable by beamforming in accordance with selected embodiments of the present disclosure.

To illustrate the improved target DoA detection benefits of the matrix array completion processing techniques disclosed herein, reference is now made to FIG. 15 which depicts a computer simulation 15 of the normalized angle spectrum comparison of different beamformer output results for detecting three non-separable targets 15A, 15B, 15C. The first beamformer output result 15-1 depicts the beamforming angle spectrum generated by a FBHM process that is applied to an ideal uniform linear filled array of antenna elements, where the target peaks 15B, 15C are contained within a single lobe of the ideal filled array spectrum. The second beamformer output result 15-2 depicts the FBHM-based beamforming angle spectrum generated from a sparse linear array of antenna elements, where the beamformer output 15-2 includes ambiguity sidelobes. The third beamformer output result 15-3 depicts the beamforming angle spectrum generated from a sparse linear array of antenna elements by performing low-rank recovery to complete the FBHM process. As shown, the recovered spectrum 15-3 aligns with the ideal filled array spectrum 15-1, but the peaks 15B, 15C are not distinguishable. Finally, the vertical black dashed lines 15D, 15E, 15F show the target DoA estimated values computed directly from the matrix-completed sparse array 15-3 by using a Super Matrix Pencil algorithm. As the simulated beamformer output results show, the sparse array angle spectrum 15-3 generated from a completed forward backward Hankel matrix can be processed by a super-resolution DoA estimation algorithm to detect the targets 15A, 15B, 15C that are not separable by beamforming.

Figure 16:
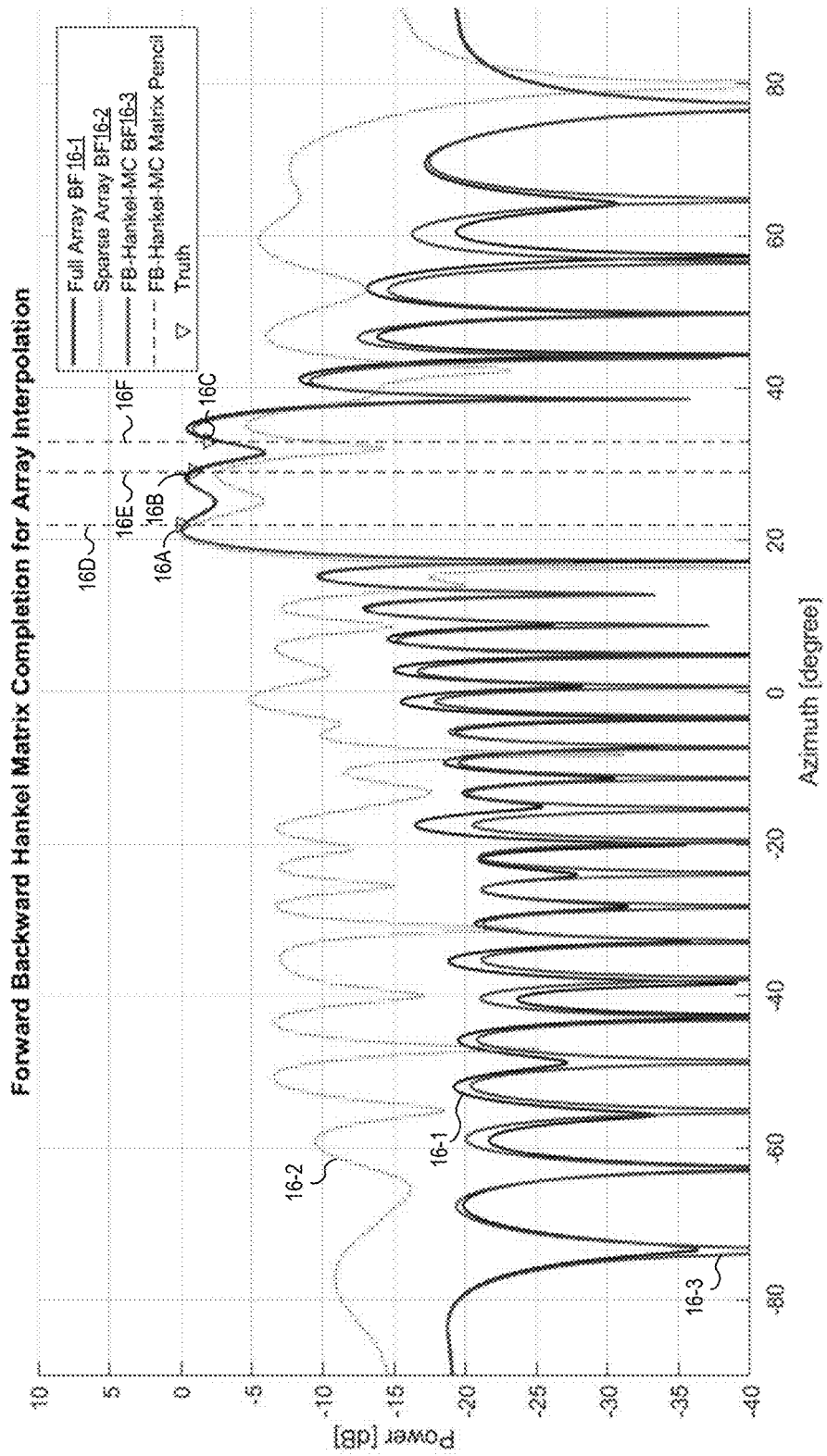
FIG. 16 depicts the comparative performance of a sparse array angle spectrum generated from a completed forward backward Hankel matrix to detect 3 targets that are separable by beamforming but with biased peak positions in accordance with selected embodiments of the present disclosure.

To illustrate the improved target DoA detection benefits of the matrix array completion processing techniques disclosed herein, reference is now made to FIG. 16 which depicts a computer simulation 16 of the normalized angle spectrum comparison of different beamformer output results for detecting three separable targets 16A, 16B, 16C. The first beamformer output result 16-1 depicts the beamforming angle spectrum generated by a FBHM process that is applied to an ideal uniform linear filled array of antenna elements, where the three target peaks 16A-C are slightly misaligned with the ideal filled array spectrum due to bias in the beamforming angle spectrum. The second beamformer output result 16-2 depicts the FBHM-based beamforming angle spectrum generated from a sparse linear array of antenna elements, where the beamformer output 16-2 includes ambiguity sidelobes. The third beamformer output result 16-3 depicts the beamforming angle spectrum generated from a sparse linear array of antenna elements by performing low-rank recovery to complete the FBHM process. As shown, the recovered spectrum 16-3 aligns with the ideal filled array spectrum 16-1, but the peak positions are biased. Finally, the vertical black dashed lines 16D, 16E, 16F show the target DoA estimated values computed directly from the matrix-completed sparse array 16-3 by using a Super Matrix Pencil algorithm. As the simulated beamformer output results show, the sparse array angle spectrum 16-3 generated from a completed forward backward Hankel matrix can be processed by a super-resolution DoA estimation algorithm without bias to detect the targets 16A, 16B, 16C.

As seen from the foregoing examples, the disclosed FBHM array completion processing techniques disclosed herein provide improved target DoA detection benefits over conventional beamforming angle spectrum approaches. However, situations arise when targets are spaced extremely closely such that they cannot be separated by using FBHM array completion processing techniques with super resolution algorithms, resulting in reporting of one or more false targets. To address such situations, selected embodiments of the disclosed FBHM array completion processing may generate an apodized sparse array angle spectrum from a completed forward backward Hankel/Toeplitz matrix to detect targets that are not separable by beamforming and to eliminate false targets. In such embodiments, an apodized angle spectrum can be generated as the minimum magnitude spectrum values selected between the spectrums of the first recovered filled array measurement vector (e.g., forward array measurement vector 136) and second recovered filled array measurement vector (e.g., backward array measurement vector 138).

Figure 17:
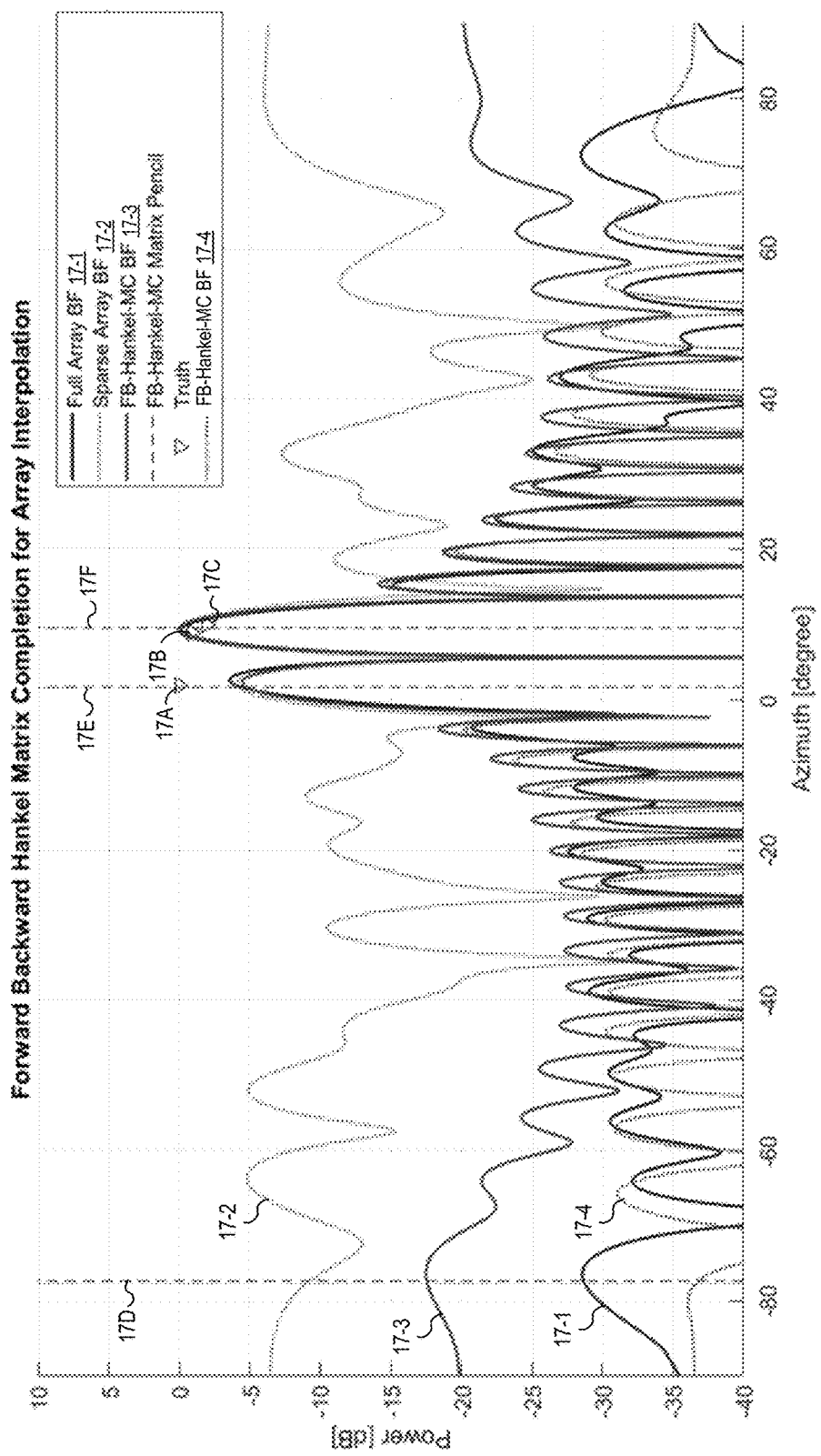
FIG. 17 depicts the comparative performance of an apodized sparse array angle spectrum generated from a completed forward backward Hankel matrix to detect targets that are not separable by beamforming and to eliminate false targets in accordance with selected embodiments of the present disclosure.

To illustrate the improved target DoA detection benefits of using an apodized spectrum generated with the matrix array completion processing techniques disclosed herein, reference is now made to FIG. 17 which depicts a computer simulation 17 of the normalized angle spectrum comparison of different beamformer output results for detecting three targets 17A, 17B, 17C that are not separable by beamforming. The first beamformer output result 17-1 depicts the beamforming angle spectrum generated by a FBHM process that is applied to an ideal uniform linear filled array of antenna elements, where the three target peaks 17A-C are slightly misaligned with the ideal filled array spectrum due to bias in the beamforming angle spectrum. The second beamformer output result 17-2 depicts the FBHM-based beamforming angle spectrum generated from a sparse linear array of antenna elements, where the beamformer output 17-2 includes significant ambiguity sidelobes. The third beamformer output result 17-3 depicts the beamforming angle spectrum generated from a sparse linear array of antenna elements by performing low-rank recovery to complete the FBHM process. In addition, a fourth beamformer output result 17-4 depicts the apodized beamforming angle spectrum generated from the min-magnitude spectrum between the spectrums of the first and second recovered filled array measurement vectors extracted by performing low-rank recovery to complete the FBHM process. Finally, the vertical black dashed lines 17D, 17E, 17F show the target DoA estimated values computed directly from the matrix-completed sparse array 17-3 by using a Super Matrix Pencil algorithm. While the recovered spectrum 17-3 aligns with the ideal filled array spectrum 17-1 in the areas close to the actual targets 17A-C, the peaks 17B, 17C are not distinguishable. The super resolution in this case also fails to resolve all the targets 17B, 17C because they are too close, so only a single vertical black dashed line 17F is shown for both targets. In addition, the recovered spectrum 17-3 includes an ambiguity sidelobe that causes a false target DoA estimate 17D to be generated by the Super Matrix Pencil algorithm. By further checking the magnitude in the apodized beamforming angle spectrum 17-4, the false target 17D can be ruled out as the magnitude of the apodized beamforming angle spectrum 17-4 is below the peak magnitude by an amount exceeding a predetermined threshold (e.g., 15 dB). This results from the fact that the apodized beamforming angle spectrum 17-4 has lower sidelobes than the non-apodized beamforming angle spectrum 17-3, and can thus be used for filtering out false targets (e.g., 17D). As a result, the apodized beamforming angle spectrum 17-4 generated from a completed forward backward Hankel matrix can be processed by a super-resolution DoA estimation algorithm without bias to detect the targets 17A-C.

Figure 18:
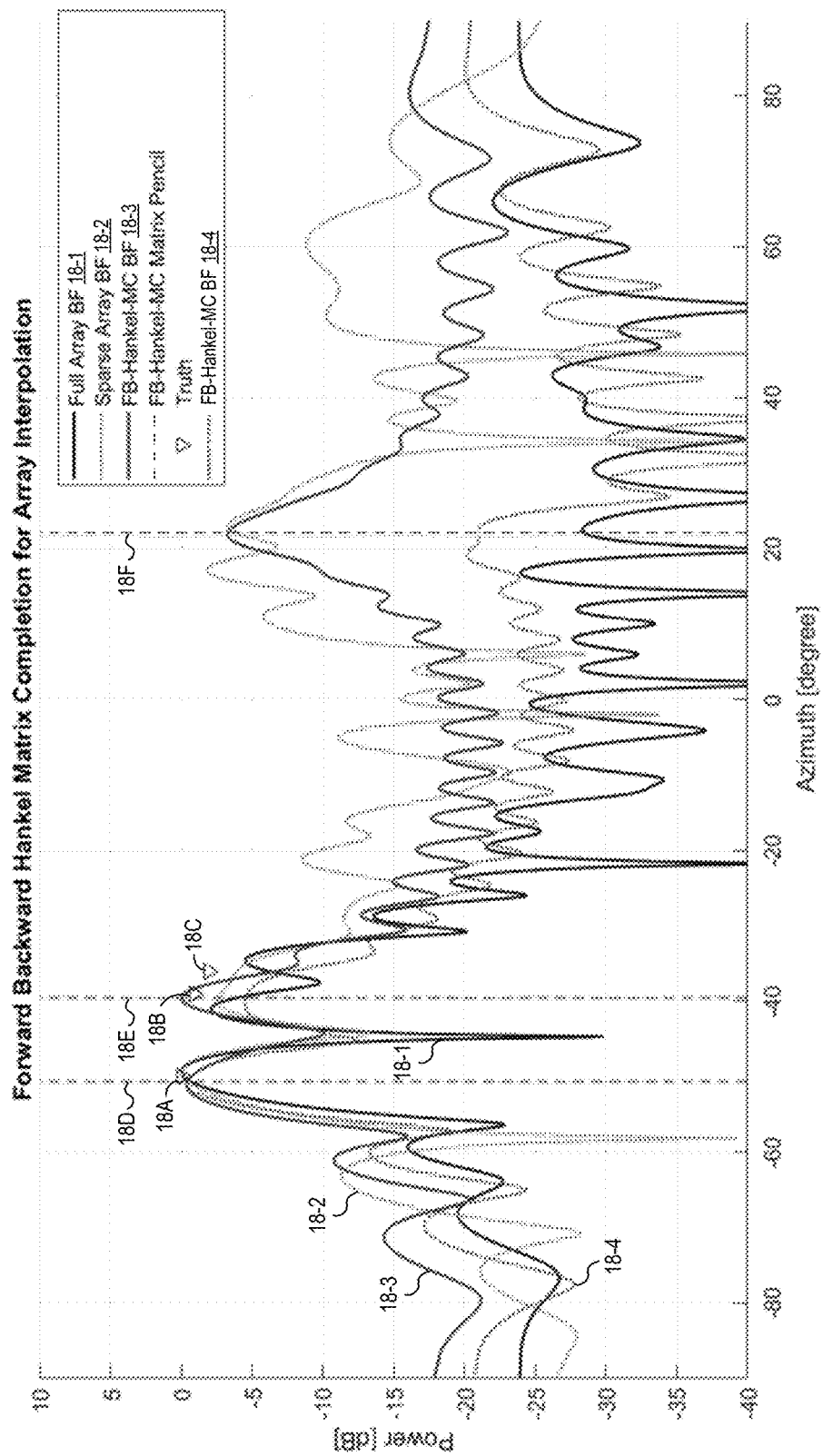
FIG. 18 depicts the comparative performance of an apodized sparse array angle spectrum generated from a completed forward backward Hankel matrix to detect targets that are not separable by beamforming and to eliminate false targets in accordance with selected embodiments of the present disclosure.

To provide another example of the improved target DoA detection benefits of using an apodized spectrum generated with the matrix array completion processing techniques disclosed herein, reference is now made to FIG. 18 which depicts a computer simulation 18 of the normalized angle spectrum comparison of different beamformer output results for detecting three targets 18A, 18B, 18C, where two of the targets 18B, 18C are spaced extremely closely together such that they cannot be separated by even super resolution algorithms. The first beamformer output result 18-1 depicts the beamforming angle spectrum generated by a FBHM process that is applied to an ideal uniform linear filled array of antenna elements, where the three target peaks 18A-C are slightly misaligned with the ideal filled array spectrum due to bias in the beamforming angle spectrum. The second beamformer output result 18-2 depicts the FBHM-based beamforming angle spectrum generated from a sparse linear array of antenna elements, where the beamformer output 18-2 includes significant ambiguity sidelobes. The third beamformer output result 18-3 depicts the beamforming angle spectrum generated from a sparse linear array of antenna elements by performing low-rank recovery to complete the FBHM process. In addition, a fourth beamformer output result 18-4 depicts the apodized beamforming angle spectrum generated from the min-magnitude spectrum between the spectrums of the first and second recovered filled array measurement vectors extracted by performing low-rank recovery to complete the FBHM process. Finally, the vertical black dashed lines 18D, 18E, 18F show the target DoA estimated values computed directly from the matrix-completed sparse array 18-3. While the recovered spectrum 18-3 aligns with the ideal filled array spectrum 18-1 in the areas close to the actual targets 18A-C, the peaks 18B, 18C are not distinguishable. The super resolution in this case also fails to resolve all the targets 18B, 18C because they are too close, so only a single vertical black dashed line 18E is shown for both targets. In addition, the recovered spectrum 18-3 includes an ambiguity sidelobe that causes a false target DoA estimate 18F to be generated by the Super Matrix Pencil algorithm. By further checking the magnitude in the apodized beamforming angle spectrum 18-4, the false target 18F can be ruled out as the magnitude of the apodized beamforming angle spectrum 18-4 is below the peak magnitude by an amount exceeding a predetermined threshold (e.g., 15 dB). This results from the fact that the apodized beamforming angle spectrum 18-4 has lower sidelobes than the non-apodized beamforming angle spectrum 18-3, and can thus be used for filtering out false targets (e.g., 18F). As a result, the apodized beamforming angle spectrum 18-4 generated from a completed forward backward Hankel matrix can be processed by a super-resolution DoA estimation algorithm without bias to detect the targets 18A-C.

Figure 19:
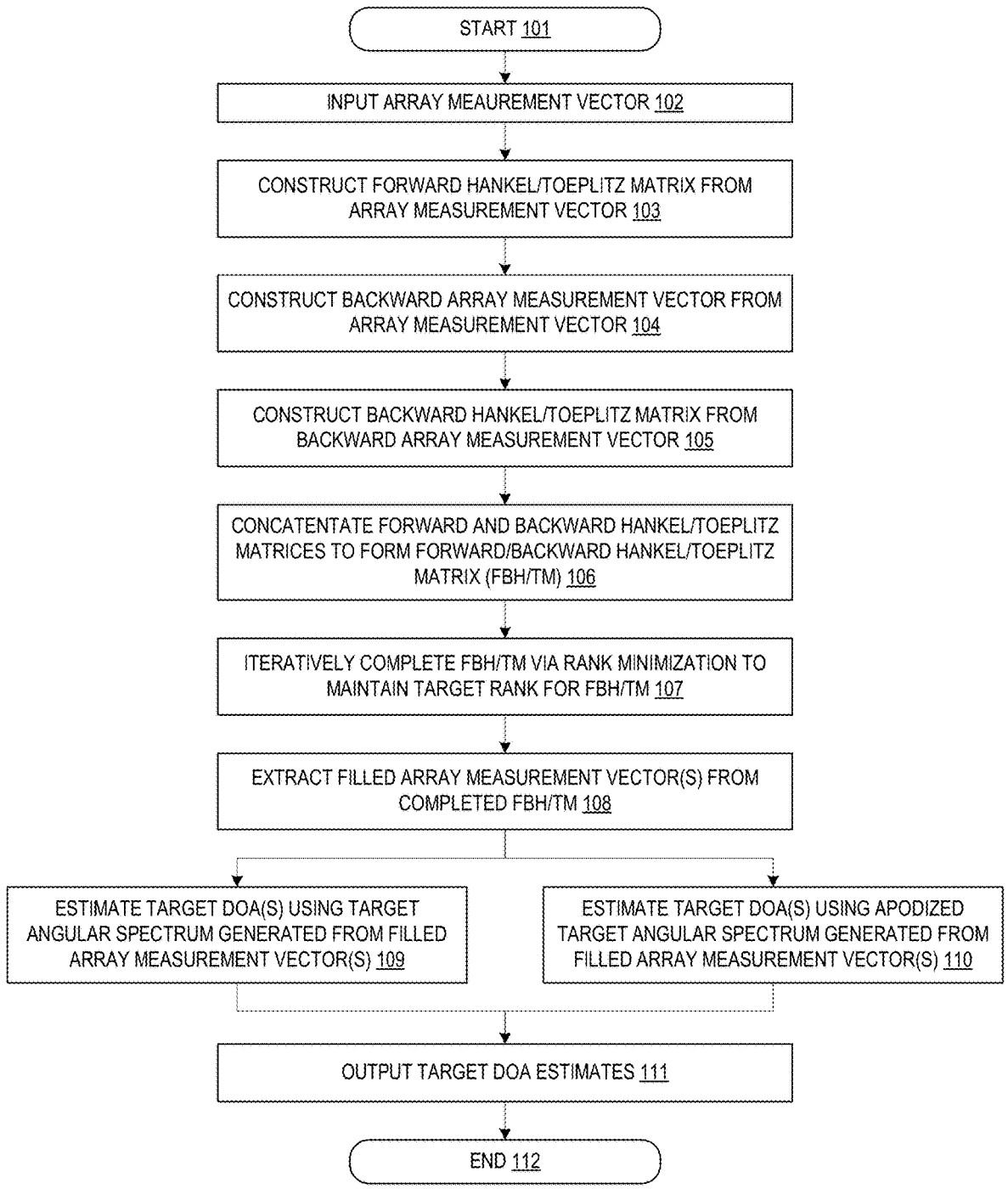
FIG. 19 illustrates a simplified flow chart showing the logic for a fast forward backward matrix completion and target DoA estimation sequence in accordance with selected embodiments of the present disclosure.

To provide additional details for an improved understanding of selected embodiments of the present disclosure, reference is now made to FIG. 19 which depicts a simplified flow chart 19 showing the logic for a fast forward backward matrix completion and target DoA estimation sequence. In an example embodiment, the control logic and methodology 19 may be implemented in whole or in part as hardware and/or software on a host computing system, processor, or microcontroller unit that includes processor and memory for storing programming control code for performing fast forward-backward matrix completion processing to compute joint array interpolation values that enable super resolution angle finding using a sparse array of virtual antennas.

The process starts (step 101) by using a small number of transmit and receive antennas to synthesize a large virtual sparse array via the multi-input multi-output (MIMO) radar technology. At step 102, an array sample or measurement vector is input that corresponds to radar reflections from the large virtual sparse array of virtual antennas. At step 103, a forward Hankel or Toeplitz matrix is constructed from the array measurement vector. At step 104, a backward array measurement vector is constructed from the array measurement vector, such as by constructing as an index-reversed version of the array measurement vector and then computing complex conjugate values for each element of the backward array measurement vector. At step 105, a backward Hankel or Toeplitz matrix is constructed from the backward array measurement vector. At step 106, the forward and backward Hankel/Toeplitz matrices are concatenated to form a forward/backward Hankel/Toeplitz Matrix (FBH/TM). In selected embodiments, forward and backward Hankel matrices are concatenated to form a left-right super Hankel matrix. In other embodiments, forward and backward Hankel matrices are concatenated to form a top-bottom super Hankel matrix. In selected embodiments, forward and backward Toeplitz matrices are concatenated to form a left-right super Toeplitz matrix. In other embodiments, forward and backward Toeplitz matrices are concatenated to form a top-bottom super Toeplitz matrix.

At step 107, missing elements from the forward/backward Hankel/Toeplitz Matrix are iteratively completed with an interpolation technique to form a completed forward/backward Hankel/Toeplitz Matrix. As disclosed herein, the interpolation technique may use a measurement-preserving rank minimization process to maintain the target rank when forming the completed forward/backward Hankel/Toeplitz Matrix. FB Hankel matrix completion based array interpolation not only smooths the noise effect on target's parameter estimation, but also provides degree of freedom to construct a low-rank matrix with larger dimensions than the forward only (FO) Hankel matrix case. As a result, more targets can be completed and estimated with better accuracy under FB Hankel matrices. Second, the fast algorithm yields compact singular vectors of the completed FB Hankel matrix which can be directly utilized in the matrix pencil method.

At step 108, one or more filled array measurement vectors are extracted from the completed forward/backward Hankel/Toeplitz Matrix. For example, a forward array measurement vector may be extracted from the first column and last row of the left half of a completed left-right super FBHM, thereby forming a first recovered filled array measurement vector. In addition or in the alternative, a backward array measurement vector may be extracted from the first column and last row of the right half of the completed left-right super FBHM, followed by reversing the indices of the backward array measurement vector and applying complex conjugation to obtain a second recovered filled array measurement vector. As will be appreciated, the recovered filled array measurement vector(s) can also be extracted from completed top-bottom super FBHM structures, as well as from left-right super FBTM structures and top-bottom super FBTM structures.

At step 109, the recovered filled array measurement vector(s) are used to estimate target Direction of Arrival values using a suitable super-resolution DoA estimation algorithm. In other embodiments, one or more target DoA values may be estimated using the target angular spectrum generated from the recovered filled array measurement vectors. In another embodiment, a super-resolution angular-domain spectral analysis algorithm may be used to compute and compare first and second estimates of the target DoAs from, respectively, the first and second recovered filled array measurement vectors, so that the final DoAs are reported only if the first and second estimated target DoAs are consistent.

Alternatively at step 110, an apodized target angular spectrum may be generated from the recovered filled array measurement vector(s) and used to estimate target Direction of Arrival values. In selected embodiments, the apodized target angular spectrum may be extracted by computing first and second target angular spectrums using, respectively, the first and second recovered filled array measurement vectors, and then taking the minimum magnitude spectrum samples from the first and second target angular spectrums to form the final apodized target angular spectrum with ambiguity sidelobes suppressed.

As will be appreciated by persons skilled in the art, any suitable super-resolution DoA estimation algorithm may be used to process the target angular spectrum (from step 109) or the apodized the target angular spectrum (from step 110), including but not limited to the beamforming algorithms based on Fourier analysis of the spatial frequency components of the co-array outputs, such as Discrete Fourier Transform or Fast Fourier Transform. Alternative super-resolution angle estimation algorithms include, but not limit to, Multiple Signal Classification (MUSIC) algorithm and its derivatives, Rotational Invariance (ESPRIT) algorithm and its derivatives, Matrix Pencil algorithm and its derivatives, Method of Direction Estimation (MODE) algorithm, Noise or Signal Subspace Fitting algorithm or its derivatives, Maximum Likelihood Estimator based algorithms, and Sparsity Constraint based or L1-Norm minimization based algorithms, among others. For example, a matrix pencil may be computed directly from one or more of the recovered filled array measurement vectors.

At step 111, the DoA estimate(s) of the target(s) are output by detecting peaks in the (apodized) angle spectrum to find target DoA values.

At step 112, the DoA estimation processing ends, and additional processing may be performed to generate a target map to identify the range, Doppler, and angle values for each detected target.

As disclosed herein, selected embodiments of the disclosed distributed aperture radar system may provide several enhancements when compared with conventional radar systems. In addition to enabling the construction of a single large coherent aperture from two or more distributed radars which achieves high angular resolution and suppresses spurious side lobes, the disclosed distributed aperture radar system can use RF front-end and signal processing blocks of existing radar designs without modifications, thereby minimizing the cost of developing the new solution. In addition, the present disclosure provides an efficient implementation for fast forward-backward matrix completion for joint array interpolation and super resolution angle finding by exploiting the structure of Hankel or Toeplitz matrices. The proposal provides a higher degree of freedom to construct a low-rank matrix with larger dimensions, as a result of which, more targets can be completed and estimated with better accuracy. In addition, when distributed radars are separated at a distance, the spurious sidelobes that result from virtual sparse apertures are mitigated or suppressed by completing or recovering a low-rank forward-backward (FB) Hankel or Toeplitz matrix as disclosed herein to enables larger separation between the radars without significantly increasing false detections.

By now it should be appreciated that there has been provided a distributed aperture radar architecture, circuit, method, and system that includes a plurality of small aperture radar devices that are physically distributed from one another and connected to a radar control processing unit. Each of the small aperture radar devices includes a first plurality of transmit antennas which are controlled by the radar control processing unit to transmit MIMO radar signals. In addition, each small aperture radar device includes a first plurality of receive antennas which are controlled by the radar control processing unit to receive MIMO radar signal returns. Each of the small aperture radar devices also includes a receive processing module which is configured to generate digital output signals from the MIMO radar signal returns. The radar control processing unit is configured to process the digital output signals generated by the plurality of small aperture radar devices to construct one or more sparse measurement array vectors. The radar control processing unit is also configured to construct a sparse forward-backward matrix from the one or more sparse measurement array vectors. In addition, the radar control processing unit is configured to construct beamforming outputs of a completed virtual array aperture by performing forward-backward matrix completion processing of the sparse forward-backward matrix to construct a completed forward-backward matrix by filling holes in the sparse MIMO virtual array aperture to suppress spurious sidelobes caused by holes in the sparse forward-backward matrix. In selected embodiments, the radar control processing unit is configured to construct beamforming outputs of the completed virtual array aperture by performing forward-backward Hankel matrix completion processing. In other embodiments, the radar control processing unit is configured to construct beamforming outputs of the completed virtual array aperture by performing forward-backward Toeplitz matrix completion processing. In selected embodiments, the radar control processing unit is configured to construct the completed forward-backward matrix by iteratively applying a rank minimization process to the sparse forward-backward matrix. In other embodiments, the radar control processing unit is configured to construct the completed forward-backward matrix by iteratively applying a nuclear-norm minimization processes to the sparse forward-backward matrix. In selected embodiments, the radar control processing unit is configured to construct the sparse forward-backward matrix by horizontally or vertically concatenating a forward Hankel matrix and a backward Hankel matrix. In other embodiments, the radar control processing unit is configured to construct the sparse forward-backward matrix by horizontally or vertically concatenating a forward Toeplitz matrix and a backward Toeplitz matrix. The radar control processing unit is also configured to compute one or more super resolution direction of arrival (DoA) estimation values based on the completed forward-backward matrix. In selected embodiments, the radar control processing unit is configured to compute one or more super resolution direction of arrival (DoA) estimation values by constructing a matrix pencil based on or as a function of the completed forward-backward matrix. In selected embodiments, the radar control processing unit is configured to compute beamforming outputs obtained from an apodized beamforming spectrum. In such embodiments, the apodized beamforming spectrum may be constructed by extracting a completed forward array measurement vector and a completed backward array measurement vector from the completed forward-backward matrix; computing a first spectrum and a second spectrum from, respectively, the completed forward array measurement vector and the completed backward array measurement vector; and taking a minimal of the first spectrum and second spectrum to form the apodized beamforming spectrum. In such embodiments, the radar control processing unit may be configured to compute one or more super resolution DoA estimations with false targets suppressed by checking the apodized beamforming spectrum against a detection threshold relative to a spectral maximum peak.

In another form, there is provided a method, architecture, circuit, and system for operating a radar system comprising a plurality of transmit and receive antennas and a radar control processing unit. In the disclosed methodology, orthogonal MIMO radar signals are transmitted from transit antennas in the plurality of transmit and receive antennas. In response, MIMO radar signal returns are received from receive antennas in the plurality of transmit and receive antennas. The received MIMO radar signal returns are processed to generate one or more digital output signals. At the radar control processing unit, one or more sparse measurement array vectors are constructed from the digital output signals. The radar control processing unit also constructs a sparse forward-backward matrix from the one or more sparse measurement array vectors. In selected embodiments, the sparse forward-backward matrix is constructed by horizontally or vertically concatenating a forward Hankel matrix and a backward Hankel matrix, or by horizontally or vertically concatenating a forward Toeplitz matrix and a backward Toeplitz matrix. In addition, the radar control processing unit performs forward-backward matrix completion processing of the sparse forward-backward matrix to construct a completed forward-backward matrix by filling holes in the sparse forward-backward matrix. In selected embodiments, the forward-backward matrix completion processing is implemented with forward-backward Hankel matrix completion processing or forward-backward Toeplitz matrix completion processing. In other embodiments, the forward-backward matrix completion processing is implemented by iteratively applying a rank minimization process or a nuclear-norm minimization process to the sparse forward-backward matrix. The radar control processing unit also computes one or more super resolution direction of arrival (DoA) estimation values based on the completed forward-backward matrix. In selected embodiments, the one or more super resolution DoA estimation values are computed by constructing a matrix pencil based on or as a function of the completed forward-backward matrix.

In yet another form, there is provided a radar system, method, architecture, circuit, and apparatus that includes communication circuitry to transmit radar signals and to receive reflections of the radar signals from a target. The disclosed apparatus also includes first processing circuitry to mathematically process digital signals representative of the received reflections of the radar signals to construct beamforming outputs of a completed virtual array aperture by performing forward-backward matrix completion processing of a sparse forward-backward matrix to construct a completed forward-backward matrix by filling holes in the sparse forward-backward matrix to suppress spurious sidelobes caused by holes in the sparse forward-backward matrix. In selected embodiments, the first processing circuitry performs forward-backward matrix completion processing by performing forward-backward Hankel matrix completion processing or forward-backward Toeplitz matrix completion processing. In other embodiments, the first processing circuitry constructs the completed forward-backward matrix by iteratively applying a rank minimization process or a nuclear-norm minimization process to the sparse forward-backward matrix. In addition, the disclosed circuitry includes second processing circuitry to estimate one or more super resolution direction of arrival (DoA) values based on the completed forward-backward matrix. In selected embodiments, the second processing circuitry estimates one or more super resolution DoA values based on a matrix pencil constructed based on or as a function of the completed forward-backward matrix.

In still yet another form, there is provided a monostatic MIMO radar device connected to a radar control processing unit. As disclosed, the monostatic radar device includes a first plurality of transmit antennas which are controlled by the radar control processing unit to transmit MIMO radar signals, a first plurality of receive antennas which are controlled by the radar control processing unit to receive MIMO radar signal returns, and a receive processing module which is configured to generate digital output signals from the MIMO radar signal returns. In addition, the radar control processing unit is configured to process the digital output signals generated by the receive processing module to construct one or more sparse measurement array vectors. In addition, the radar control processing unit is configured to construct a sparse forward-backward matrix from the one or more sparse measurement array vectors. In addition, the radar control processing unit is configured to construct beamforming outputs of a completed virtual array aperture by performing forward-backward matrix completion processing of the sparse forward-backward matrix to construct a completed forward-backward matrix by filling holes in the sparse forward-backward matrix to suppress spurious sidelobes caused by holes in the sparse forward-backward matrix. In addition, the radar control processing unit is configured to compute one or more super resolution direction of arrival (DoA) estimation values based on the completed forward-backward matrix Although the described exemplary embodiments disclosed herein focus on example automotive radar circuits, systems, and methods for using same, the present invention is not necessarily limited to the example embodiments illustrate herein. For example, various embodiments of a distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A distributed aperture radar system comprising a plurality of small aperture radar devices that are physically distributed from one another and connected to a radar control processing unit;
   wherein each of the plurality of small aperture radar devices comprises:
   a first plurality of transmit antennas which are controlled by the radar control processing unit to transmit MIMO radar signals,
   a first plurality of receive antennas which are controlled by the radar control processing unit to receive MIMO radar signal returns, and
   a receive processing module which is configured to generate digital output signals from the MIMO radar signal returns; and
   wherein the radar control processing unit is configured:
   to process the digital output signals generated by the plurality of small aperture radar devices to construct one or more sparse measurement array vectors,
   to construct a sparse forward-backward matrix from the one or more sparse measurement array vectors, to perform forward-backward matrix completion processing of the sparse forward-backward matrix to construct a completed forward-backward matrix by filling holes in the sparse forward-backward matrix to suppress spurious sidelobes caused by holes in the sparse forward-backward matrix, and to compute one or more super resolution direction of arrival (DoA) estimation values based on the completed forward-backward matrix.

2. The distributed aperture radar system of claim 1, where the radar control processing unit is configured to construct beamforming outputs of a completed virtual array aperture by performing forward-backward Hankel matrix completion processing.

3. The distributed aperture radar system of claim 1, where the radar control processing unit is configured to construct beamforming outputs of a completed virtual array aperture by performing forward-backward Toeplitz matrix completion processing.

4. The distributed aperture radar system of claim 1, where the radar control processing unit is configured to construct the completed forward-backward matrix by iteratively applying a rank minimization process to the sparse forward-backward matrix.

5. The distributed aperture radar system of claim 1, where the radar control processing unit is configured to construct the completed forward-backward matrix by iteratively applying a nuclear-norm minimization processes to the sparse forward-backward matrix.

6. The distributed aperture radar system of claim 1, where the radar control processing unit is configured to construct the sparse forward-backward matrix by horizontally or vertically concatenating a forward Hankel matrix and a backward Hankel matrix.

7. The distributed aperture radar system of claim 1, where the radar control processing unit is configured to construct the sparse forward-backward matrix by horizontally or vertically concatenating a forward Toeplitz matrix and a backward Toeplitz matrix.

8. The distributed aperture radar system of claim 1, where the radar control processing unit is configured to compute one or more super resolution DoA estimation values by constructing a matrix pencil based on or as a function of the completed forward-backward matrix.

9. The distributed aperture radar system of claim 1, where the radar control processing unit is configured to compute beamforming outputs obtained from an apodized beamforming spectrum which is constructed by:
   extracting a completed forward array measurement vector and a completed backward array measurement vector from the completed forward-backward matrix;
   computing a first spectrum from the completed forward array measurement vector;
   computing a second spectrum from the completed backward array measurement vector; and
   taking a minimal of the first spectrum and second spectrum to form the apodized beamforming spectrum.

10. The distributed aperture radar system of claim 9, where the radar control processing unit is configured to compute one or more super resolution DoA estimations with false targets suppressed by checking the apodized beamforming spectrum against a detection threshold relative to a spectral maximum peak.

11. A method for operating a radar system comprising a plurality of transmit and receive antennas and a radar control processing unit, the method comprising:

transmitting orthogonal MIMO radar signals from transit antennas in the plurality of transmit and receive antennas;
receiving MIMO radar signal returns from receive antennas in the plurality of transmit and receive antennas;
processing the MIMO radar signal returns to generate one or more digital output signals;
processing, at the radar control processing unit, the digital output signals to construct one or more sparse measurement array vectors;
constructing, at the radar control processing unit, a sparse forward-backward matrix from the one or more sparse measurement array vectors;
performing, at the radar control processing unit, forward-backward matrix completion processing of the sparse forward-backward matrix to construct a completed forward-backward matrix by filling holes in the sparse forward-backward matrix; and
computing, at the radar control processing unit, one or more super resolution direction of arrival (DoA) estimation values based on the completed forward-backward matrix.

12. The method of claim 11, where performing forward-backward matrix completion processing comprises performing forward-backward Hankel matrix completion processing.

13. The method of claim 11, where performing forward-backward matrix completion processing comprises performing forward-backward Toeplitz matrix completion processing.

14. The method of claim 11, where performing forward-backward matrix completion processing comprises iteratively applying a rank minimization process to the sparse forward-backward matrix.

15. The method of claim 11, where performing forward-backward matrix completion processing comprises iteratively applying a nuclear-norm minimization process to the sparse forward-backward matrix.

16. The method of claim 11, where constructing the sparse forward-backward matrix comprises horizontally or vertically concatenating a forward Hankel matrix and a backward Hankel matrix.

17. The method of claim 11, where constructing the sparse forward-backward matrix comprises horizontally or vertically concatenating a forward Toeplitz matrix and a backward Toeplitz matrix.

18. The method of claim 11, where computing one or more super resolution DoA estimation values comprises constructing a matrix pencil based on or as a function of the completed forward-backward matrix.

19. An apparatus comprising:
   communication circuitry to transmit radar signals and to receive reflections of the radar signals from a target; and
   first processing circuitry to mathematically process digital signals representative of the received reflections of the radar signals to construct beamforming outputs of a completed virtual array aperture by performing forward-backward matrix completion processing of a sparse forward-backward matrix to construct a completed forward-backward matrix by filling holes in the sparse forward-backward matrix to suppress spurious sidelobes caused by holes in the sparse forward-backward matrix;
   second processing circuitry to estimate one or more super resolution direction of arrival (DoA) values based on the completed forward-backward matrix.

20. The apparatus of claim 19, where the first processing circuitry performs forward-backward matrix completion processing by performing forward-backward Hankel matrix completion processing or forward-backward Toeplitz matrix completion processing.

21. The apparatus of claim 19, where the first processing circuitry constructs the completed forward-backward matrix by iteratively applying a rank minimization process or a nuclear-norm minimization process to the sparse forward-backward matrix.

22. The apparatus of claim 19, where the second processing circuitry estimates one or more super resolution DoA values based on a matrix pencil constructed based on or as a function of the completed forward-backward matrix.

23. A monostatic MIMO radar device connected to a radar control processing unit,
wherein the monostatic MIMO radar device comprises:
a first plurality of transmit antennas which are controlled by the radar control processing unit to transmit MIMO radar signals,
a first plurality of receive antennas which are controlled by the radar control processing unit to receive MIMO radar signal returns, and
a receive processing module which is configured to generate digital output signals from the MIMO radar signal returns; and
wherein the radar control processing unit is configured:
to process the digital output signals generated by the receive processing module to construct one or more sparse measurement array vectors,
to construct a sparse forward-backward matrix from the one or more sparse measurement array vectors,
to construct beamforming outputs of a completed virtual array aperture by performing forward-backward matrix completion processing of the sparse forward-backward matrix to construct a completed forward-backward matrix by filling holes in the sparse forward-backward matrix to suppress spurious sidelobes caused by holes in the sparse forward-backward matrix, and
to compute one or more super resolution direction of arrival (DoA) estimation values based on the completed forward-backward matrix.

\* \* \* \* \*